(12) United States Patent
Bergsten

(10) Patent No.: US 6,282,610 B1
(45) Date of Patent: Aug. 28, 2001

(54) STORAGE CONTROLLER PROVIDING STORE-AND-FORWARD MECHANISM IN DISTRIBUTED DATA STORAGE SYSTEM

(75) Inventor: James R. Bergsten, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/231,244

(22) Filed: Jan. 15, 1999

Related U.S. Application Data

(63) Continuation-in-part of application No. 08/828,888, filed on Mar. 31, 1997, now Pat. No. 6,073,209.

(51) Int. Cl.[7] ................................................. G06F 12/02
(52) U.S. Cl. ........................ 711/114; 711/162; 707/204; 714/6; 714/11
(58) Field of Search ..................................... 711/162, 114; 714/6, 11; 707/204

(56) References Cited

U.S. PATENT DOCUMENTS

| 5,530,845 | 6/1996 | Hiatt et al. . | |
|---|---|---|---|
| 5,799,141 | * 8/1998 | Galipeau et al. | 714/13 |
| 5,857,208 | * 1/1999 | Ofek | 707/204 |
| 5,953,729 | * 9/1999 | Cabrera et al. | 707/204 |
| 6,052,797 | * 4/2000 | Ofek et al. | 714/6 |

* cited by examiner

Primary Examiner—Hiep T. Nguyen

(57) ABSTRACT

A network comprises at least one host processing system, a number of storage controllers, each coupled to one of a plurality of storage arrays, each storage array including at least one mass storage device. Each storage controller may be coupled to at least one host processing system and to at least one other storage controller to control access of the host processing systems to the mass storage devices. Multiple copies of data are maintained in storage arrays that are geographically remote to each other, such that any copy can be accessed by any host. Each storage controller includes an interface with a host that emulates a mass storage device and an interface with a local storage array that emulates a host. The interfaces to the host and local storage arrays are independent of the type of host or devices in the local storage array. Two or more hosts may be dissimilar to each other, and two or more storage arrays may include dissimilar mass storage devices. Hosts access stored data using virtual addressing. During a data access, the storage controller connected to the accessing host maps a virtual address provided by the host to a real physical location in any of the storage arrays, such that the actual location of the data is transparent to the host. The storage controllers provide automatic back-up and error correction as well as write protection of back-up copies.

3 Claims, 33 Drawing Sheets

STORAGE CONTROLLER PROVIDING STORE-AND-FORWARD MECHANISM IN DISTRIBUTED DATA STORAGE SYSTEM

This is a continuation-in-part of application Ser. No. 08/828,888 filed on Mar. 31, 1997 now U.S. Pat. No. 6,073,209.

FIELD OF THE INVENTION

The present invention pertains to the field of computer systems. More particularly, the present invention relates to storage controllers for controlling data transfers between one or more host processing systems and one or more data storage subsystems.

BACKGROUND OF THE INVENTION

Computer systems sometimes handle valuable or irreplaceable data. Data maintained by a computer system may be of vital importance, for example, in business applications such as airline reservations, bank account management, electronic funds transfers, shipping and receiving, and inventory control. Consequently, there is a need to ensure that valuable data is adequately protected against loss or damage.

It is common to store large volumes of data on non-volatile mass storage devices, such as magnetic or optical disks. Occasionally, however, a mass storage device will fail, resulting in the loss of stored data. Consequently, it is a common practice to store a back-up copy of data that is considered valuable on a separate, back-up storage device. For practical reasons, however, it is often necessary to locate the back-up storage device in the same geographic vicinity as the primary storage device. As a result, both the primary data and the back-up copy may be lost or destroyed due to fire, theft, vandalism, or natural disaster. Hence, there is a need for the capability to store multiple back-up copies of data in geographically separate locations, while still permitting quick and easy access by a host computer to any back-up copy.

SUMMARY OF THE INVENTION

One aspect of the present invention is a storage controller which includes a processor and a memory. The memory includes instructions which configure the storage controller to receive a single copy of data from a remote storage controller, and to store multiple copies of the data in a local storage facility based on the single copy. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A storage controller capable of providing multiple host computers system with access to multiple storage arrays is described. As will be described below in detail, the storage controller allows multiple host computer systems at different locations to access any of multiple copies of stored data. The storage controller automatically creates and manages multiple back-up copies while the host computer systems are "on line" in a manner that is both non-disruptive of, and transparent to, the host computer systems and their users. Further, the storage controller automatically detects and correct errors in stored data and automatically replaces faulty copies. Moreover, the storage controller is not dependent upon any particular hardware or software configuration of the host computer system which it services or the mass storage devices which it accesses. The storage controller emulates a local storage array for the host computer system which it services and emulates a host computer system for the local storage array which it accesses. Host computer systems access stored data using virtual device addresses, which are mapped to real device addresses by the storage controller.

Figure 1:
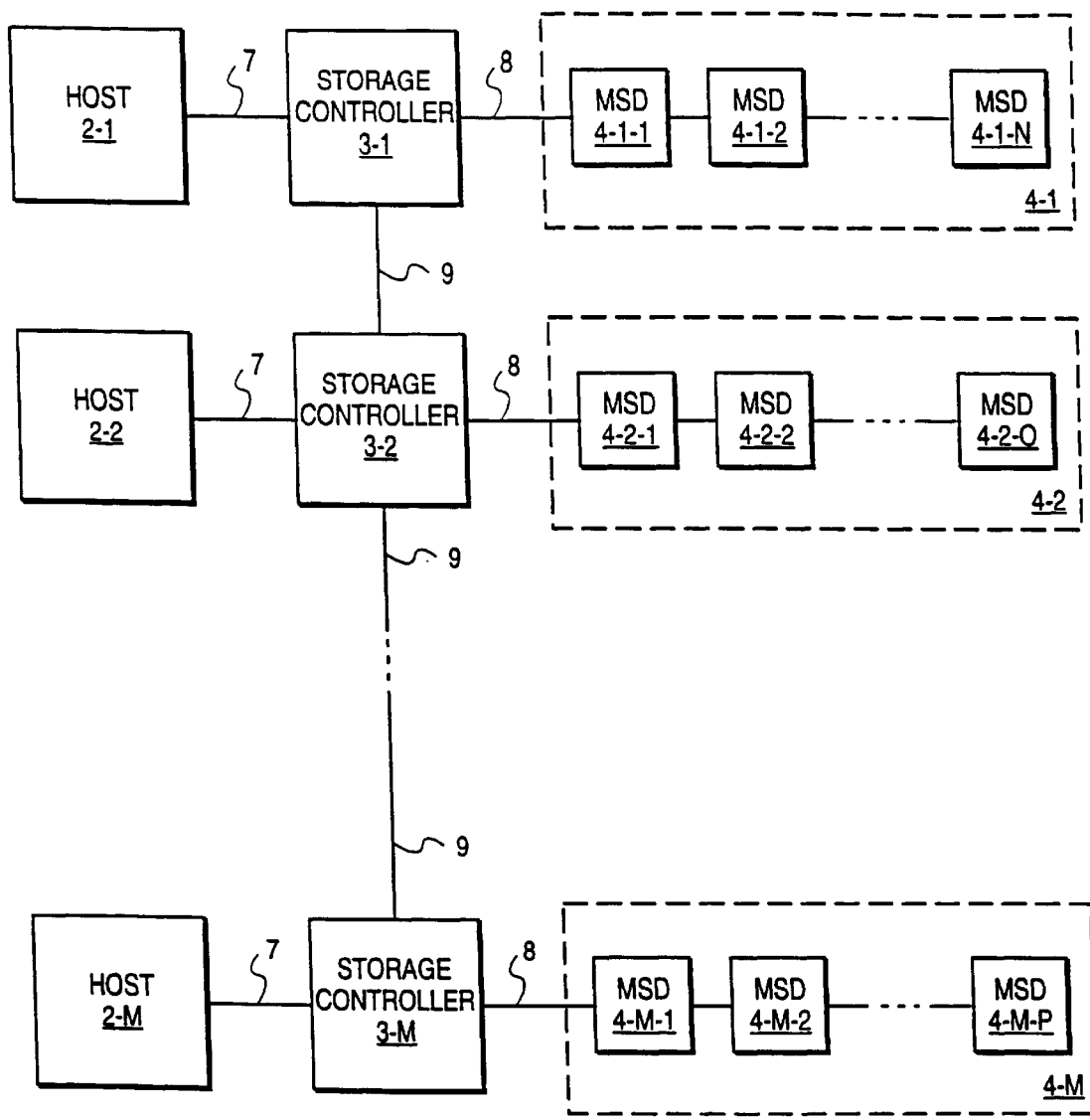
FIG. 1 illustrates a computing system in which a number of storage controllers provide multiple host computers with access to multiple storage arrays.

FIG. 1 illustrates a computing system in which a number of storage controllers of the present invention provide a number of host computer systems with access to a number of storage arrays. Specifically, the computing system includes M storage controllers, 3-1 through 3-M, which may be located remotely with respect to each other; M host computers, 2-1 through 2-M, each of which is locally coupled to a different one of storage controllers 3-1 through 3-M; and M storage arrays, 4-1 through 4-M, each of which is locally coupled to a different one of storage controllers 3-1 through 3-M. Each of the storage arrays includes a number of mass storage devices (MSDs) coupled to its local storage controller in a daisy chain configuration. Specifically, storage array 4-1 includes N MSDs, 4-1-1 through 4-1-N; storage array 4-2 includes O MSDS, 4-2-1 through 4-2-O; and, storage array 4-M includes P MSDs, 4-M-1 through 4-M-P.

Each of the storage controllers is coupled to another storage controller via a communication link 9. A portion of communication link 9 between two geographically-separated storage controllers may be provided by a local area network (LAN). For example, in one embodiment, a given communication link 9 may be implemented partly on a Fast Ethernet; other portions of the link 9 can be implemented as an Asynchronous Transfer Mode (ATM) link, a T1 or T3 link, a Fiber Distributed Data Interface (FDDI) link, or any other suitable type of link.

Note that any of the data communication paths 7, 8, and 9 may actually consist of two or more redundant, physical paths. Therefore, a failure of any single physical connection does not affect the ability to access any stored data.

Each of the host computer systems 2 may be a conventional computer system. For example, a host computer system may be a personal computer (PC), a mini-computer, or a mainframe. In addition, any of the host computer systems may be a server for one or more client computer systems (not shown).

Each MSD includes a non-volatile facility for storing large volumes of data, such as a magnetic disk or tape, an optical storage device such as Compact Disk-ROM (CD-ROM), CD-Recordable (CD-R), Digital Versatile Disk (DVD), a magneto-optical (MO) device, or the like. The MSDs within the computing system need not be of the same device type. That is, the MSDs in any given storage array may use a different type of storage medium from those in any other storage array.

Each storage array may be located geographically distant from the other storage arrays. Multiple copies are generally maintained on different, geographically-separated storage arrays. Hence, the loss of one or more MSDs in a given storage array will not result in the complete loss of data. With respect to a given (local) storage controller, any or all of the other (remote) storage controllers, host computer systems, and storage arrays may therefore be located at distant locations to the local storage controller.

Storage controllers 3-1 through 3-M cooperate to provide any of host computer systems 2-1 through 2-M with access to any of storage arrays 4-2 through 4-M. Each one of storage controllers 3-1 through 3-M directly services one local host computer system and one local storage array in one embodiment. For example, in the embodiment shown in FIG. 1, storage controller 3-1 services and is directly coupled to its local host computer system 2-1 via a data communication path 7. Storage controller 3-1 is directly coupled to its local data storage array 4-1 via communication path 8.

In one embodiment, each storage controller communicates with its local host computer system and its local storage array using standard Small Computer Systems Interface (SCSI) protocols. Consequently, operation of a storage controller in the manner described herein is not dependent upon the particular hardware or software configuration of any host computer or storage array, as long as those devices are SCSI-compatible. Note that in other embodiments, however, the data communication paths 7 and 8 may conform to other protocols and standards, such as serial SCSI, Fiber Channel, or ESCON. Thus, because data paths 7 and 8 are conventional interfaces, a storage controller can be used concurrently with host computers and MSDs having different configurations. For example, one host computer in the system may be a mainframe computer system while another host computer is a PC. Similarly, one storage array in the system may consist of conventional magnetic hard disk drives while another storage array consists of CD-ROM or DVD drives.

The storage controllers in the computing system cooperate to allow any of the host computer systems to access data located in any of the storage arrays. For example, host computer system 2-1 may access data located on any MSD in storage array 4-1 by communicating with storage controller 3-1. In addition, host computer system 2-1 may access data located in remote storage array 4-M by communicating with remote storage controller 3-M via storage controllers 3-1, 3-2, etc. As will be explained below, data is accessed using virtual addressing, such that a host computer system has no knowledge of which physical storage device is being accessed.

The storage controllers operate in peer-to-peer relationships (rather than master-slave relationships) with each other when responding to remote access requests. Any storage controller can access data in a remote storage array serviced by any other storage controller. Communication between individual storage controllers takes place on communication links 9 using a common protocol implemented by all storage controllers in the system. Note that various different protocols might be used for this purpose. A description of the details of such a protocol is not necessary for a complete understanding of the present invention and is therefore not provided herein.

The remote access capabilities of the storage controllers can be used advantageously in a variety of ways. The storage controllers can be used to enable sharing and centralized control of storage media. For example, the MSDs in any of the storage arrays may include CD-ROM devices, so that CD-ROMs in one a storage arrays may be shared by all host computers. Use of the devices can be recorded by one of the storage controllers. Access to CD-ROM data can therefore be monitored and controlled by a user, such as a system administrator, using the storage controller. The storage controllers also permit low-volume production of CD-Rs without specialized equipment. For example, a limited quantity of CD-R disks can be produced by writing to a single, logical CD-R drive corresponding to multiple physical CD-R devices within one or more storage arrays.

Figure 2:
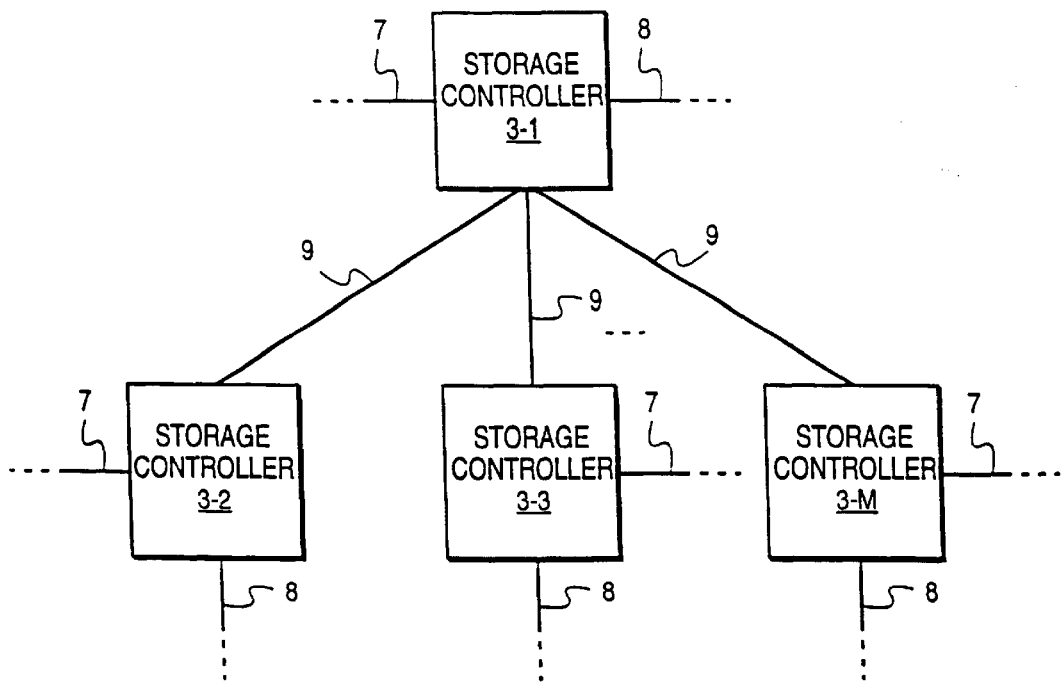
FIG. 2 illustrates a computing system according to an embodiment in which one storage controller is connected to multiple other storage controllers.

The present invention is not limited to the specific configuration shown in FIG. 1. For example, the system configuration might alternatively include only a single host computer which is coupled to multiple geographically-separated storage arrays using multiple storage controllers. In another embodiment, a storage controller may have a direct interface with more than one host or may have redundant interfaces with the same host. Each storage controller might also be coupled to more than one other storage controller, as illustrated in FIG. 2, in which storage controller 3-1 is connected to a number of other storage controllers, 3-2 through 3-M.

The storage controllers provide a number of functions and services to the host computer systems. In particular, the storage controllers automatically provide multiple back-up copies of stored data in a manner that is transparent to, and non-disruptive of, all of the host computer systems. For example, when a given data file is saved by a local host computer to its local storage array, the local storage controller causes one or more back-up copies of the data file to be stored in one or more of the remote storage arrays, without any intervention from or interruption to the local host computer. The process of backing-up data can be initiated by any storage controller in the system. This allows centralized back-up of any or all of the host computers. The number of back-up copies to be created and the locations to which the back-up copies are to be stored can be configured in advance by a system administrator. For example, these parameters can be programmed into a storage controller by connecting a keyboard and a display to ports on the storage controller. Alternatively, the storage controller can be configured by using one of the host computers to transmit configuration commands and data to the storage controller. Further, a storage controller can be configured remotely via a local storage controller. The storage controllers also perform automatic block error detection and reassignment, as will be described below in detail.

The remote data access, data mirroring, and path redundancy provided by the storage controllers allow recovery from many possible failure modes, such as failure of communication medium, failure a host computer, or failure of a storage device.

In general, when the system of FIG. 1 is first set up, or when MSDs are added to the system, all data from a "primary" MSD are automatically copied to one or more newly-added MSDs. Such copying is performed while the host computers are operating, although the copying process is transparent to the host computers 2-1 through 2-M. Copying can be throttled to reduce the impact on system performance. Once all copies are established (brought into a consistent state), only changed data are subsequently written to the secondary MSDs in response to changes dictated by a host computer.

Each of the storage controllers also provides virtualized data access and emulation, as mentioned above. A local storage controller will emulate its local storage array from the viewpoint of its local host computer system; similarly, the local storage controller will emulate its local host computer system from the viewpoint of its local storage array. Such emulation is implemented, in part, by using a common communication interface for data communication paths 7 and 8, such as SCSI. Again, in other embodiments, the data communication paths 7 and 8 may conform to other protocols and standards, such as serial SCSI, Fiber Channel, or ESCON.

A local host computer accesses data by transmitting a (virtual) host address to its local storage controller. The host address is then mapped to a real address representing a location on one or more physical MSDs, as will be described below in detail. The mapping is completely transparent to all of the host computers. To improve performance, the storage controller may distribute a single copy among multiple MSDs, which may be located in different storage arrays. Hence, in the above described mapping process, a single host address may map to multiple physical addresses, which may be distributed among multiple MSDs, and such multiple MSDs may be located in different storage arrays.

Figure 3:
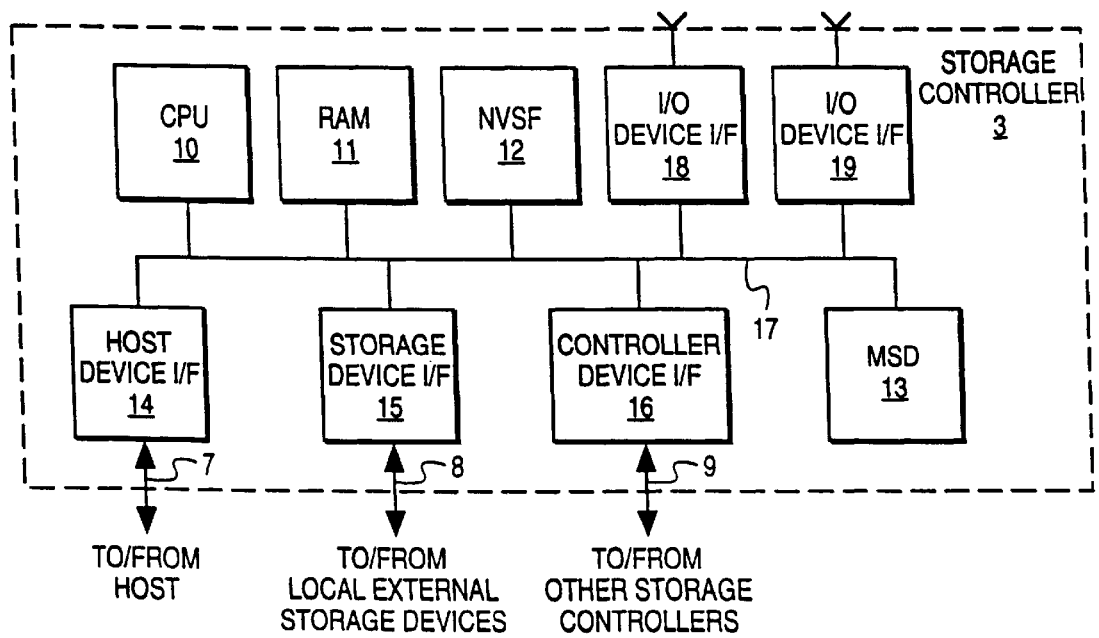
FIG. 3 is a block diagram of a storage controller.

FIG. 3 illustrates a high-level block diagram of the hardware architecture of a storage controller according to one embodiment of the present invention. Note that the illustrated embodiment is only an example; many variations on this architecture are possible for purposes of the present invention. The storage controller 3 includes a central processing unit (CPU) 10, random-access memory (RAM) 11, a non-volatile storage facility (NVSF) 12, and an internal MSD 13, each coupled to a bus 17. Bus 17 may represent multiple physical or logical buses, which may be interconnected by various bridges, controllers, and/or adapters. NVSF 12 may be, or may include, for example, a programmable non-volatile storage device, such as flash memory or electrically-erasable programmable read-only memory (EEPROM). MSD 13 may be any conventional device that is suitable for non-volatile storage of large volumes of data, such as any of those discussed above. Also coupled to the bus 17 are a host device interface 14, a storage device interface 15, a controller device interface 16, and input/output (I/O) device interfaces 18 and 19. I/O device interfaces 18 and 19 are also coupled to separate, external connectors on the storage controller 3.

The host device interface 14 connects communication path 7 to the bus 17 in order to connect a local host computer to the storage controller 3. The storage device interface 15 connects communication path 8 to the bus 17 in order to connect a local storage array to storage controller 3. In one embodiment, host device interface 14 and storage device interface 15 each comprise a SCSI adapter, such that communication between storage controller 3 and the local host computer and storage array is performed using SCSI protocols. As is well-known, the SCSI standard allows multiple peripheral devices to be connected to a host device in a daisy chain configuration. From the viewpoint of the local storage array, the storage controller 3 emulates the host device. From the viewpoint of the host device, the storage controller 3 emulates the local storage array.

The controller device interface 16 connects communication path 9 to the bus 17 in order to connect a remote storage controller to storage controller 3. Controller device interface 16 may be an Ethernet, ATM, T1, T3, or FDDI adapter, or any other suitable device, depending upon the nature of the communication link 9.

I/O device interfaces 18 and 19 may be used to connect a keyboard and a monitor to the bus 17. I/0 interface 18 and 19 may therefore be used by a systems administrator to initially configure the storage controller 3, input commands and control information to the storage controller 3, obtain status information from the storage controller 3, and other functions. Further, these interfaces 18 and 19 can be used to remotely perform these same functions on a remote storage controller via (local) storage controller 3 and communication link 9.

In one embodiment, functions of a storage controller are carried out by its CPU 10 executing sequences of instructions that are contained in a memory. More specifically, execution of the sequences of instructions contained in the memory causes the CPU 10 to perform steps according to the present invention which will be described below. For example, instructions may be loaded into RAM 11 for execution by the CPU 10 from a persistent store, such as the NVSF 12 or MSD 13. In other embodiments, hardwired circuitry may be used in place of, or in combination with, software instructions to implement the present invention. Thus, features of the storage controller are not limited to any specific combination of hardware circuitry and software, nor to any particular source for the instructions executed by a computer system.

Figure 4:
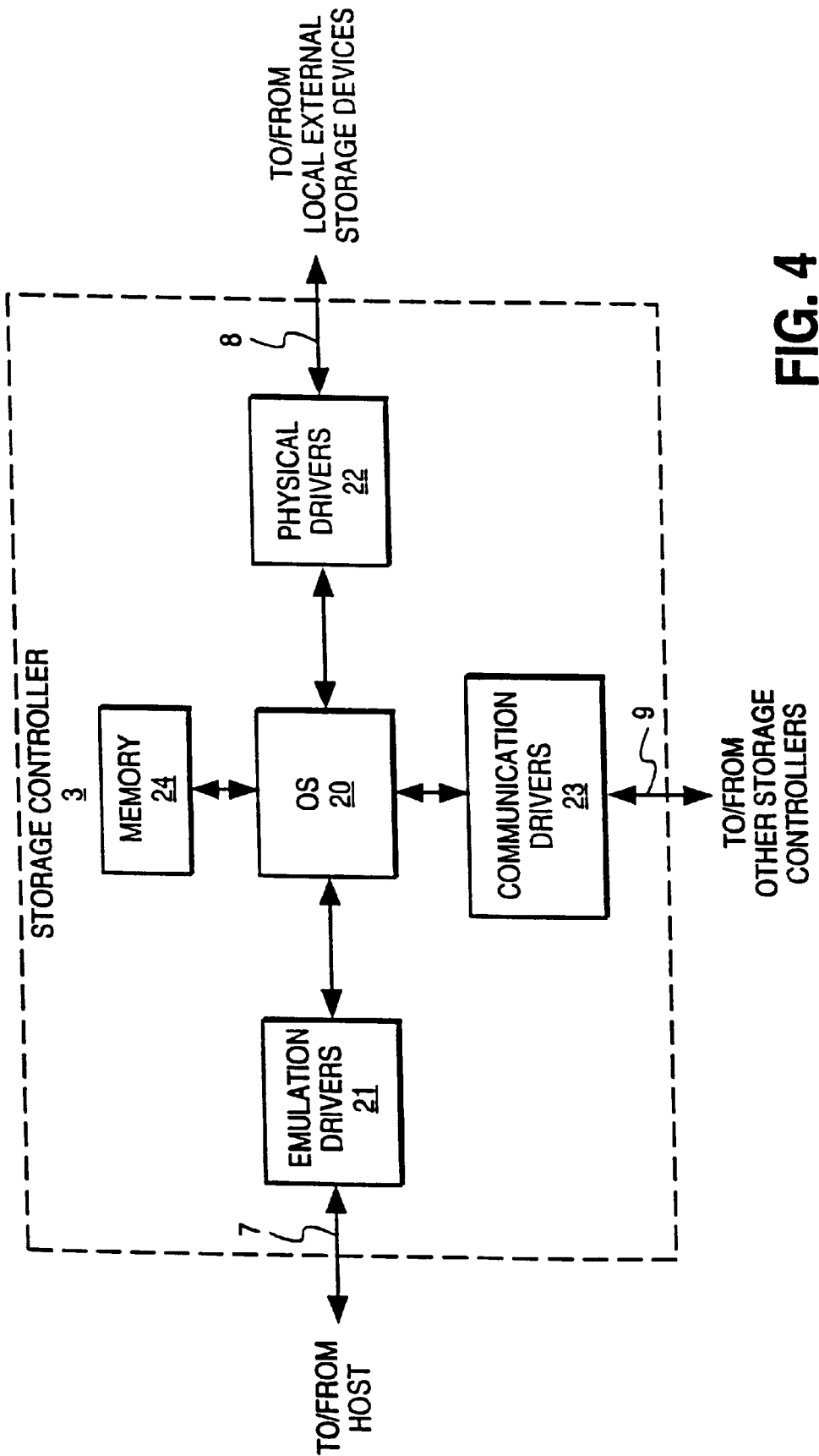
FIG. 4 is a block diagram illustrating functional modules of a storage controller.

FIG. 4 shows functional modules within a storage controller 3. Each of these functional modules may be embodied in hardware, software, or a combination of hardware and software. In one embodiment, the storage controller 3 includes an operating system (OS) 20 coupled to emulation drivers 21, physical drivers 22, communication drivers 23, and local memory 24. Memory 24 is used as a cache for certain functions and may include RAM 11, NVSF 12, and/or MSD 13 (see FIG. 3), or a combination thereof.

The OS 20 controls the overall operation of the storage controller, including emulation, data flow, caching of data in the local memory 24, control of data mirroring, and error recovery. Emulation drivers 21 are controlled by the OS 20 to provide communication of data between the storage controller 3 and the local host computer 2 via communication path 7. In particular, the emulation drivers 21 receive read and write requests from the host computer 2 and convert the read and write requests into a format recognized by the OS 20. The emulation drivers 21 further function to transfer any data received from the local storage array or a remote storage array to the local host computer. The communication drivers 23 are controlled by the OS 20 to provide communication of data between the storage controller 3 and remote storage controllers via communication path 9. The physical drivers 22 are controlled by the OS 20 to transfer data between the storage controller 3 and its local storage array. Such transfer includes the transformation of commands and control data from the format used by the storage controller 3 to the format recognized by the local storage array (e.g., SCSI).

Figure 5:
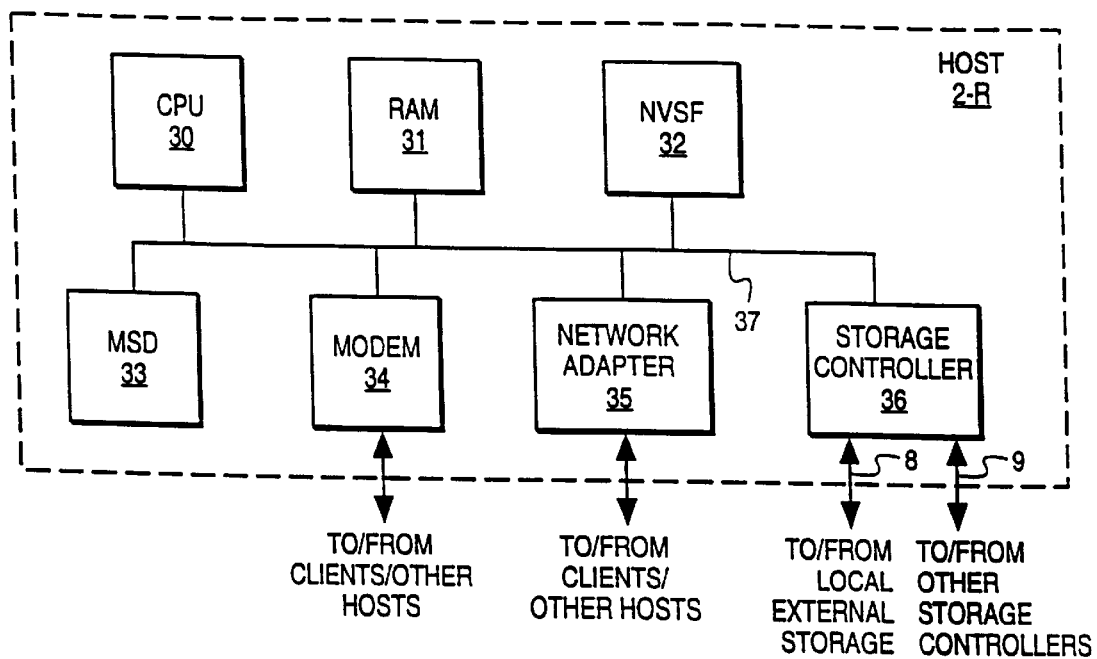
FIG. 5 is a block diagram illustrating a host computer system including a storage controller according to the present invention.

In an alternative embodiment, a storage controller 3 may be an internal component of a host computer, rather than a separate, external unit. FIG. 5 illustrates a host computer 2-R according to one such embodiment. The host computer 2-R includes a CPU 30, a RAM 31, an NVSF 32, an MSD 33, a modem 34, a network adapter 35, and a storage controller 36, each of which is coupled to a bus 37. The local bus 37 may be any conventional local bus, such as a PCI (Peripheral Component Interconnect) bus. In this embodiment, the storage controller 36 may be constructed on an add-in card inserted in the host computer 2-R. The storage controller 36 provides all of the functionality of the storage controllers described above and has essentially the same architecture. However, in contrast with the storage controllers described above, the storage controller is directly connected to the local bus 37 of the host processing system. This embodiment therefore eliminates the need for the emulation drivers 21 illustrated in FIG. 4. Communication paths 8 and 9 to the local storage array and the remote storage controllers, respectively, are provided through one or more external connectors on the host computer 2-R. The modem 34 and network adapter 35 each allow the host computer 2-R to communicate with other computer systems, such as clients or other hosts.

The functions of the storage controllers will now be described in greater detail. Each storage controller is configured to provide capability to gracefully recover from numerous types of failure modes, including block errors, device failures, and failure of communication paths, in a manner that is transparent to all hosts. For example, if an error occurs during an I/O operation, and the error is determined to result from failure of a communication medium (e.g., failure of one of the communication paths 7, 8 or 9), the storage controller automatically performs the operation using an alternate communication path, if available. If the error is determined to be a device failure (i.e., failure of an MSD), then the storage controller automatically attempts to perform the write operation to an alternate storage device. If the error is a block error, the system automatically attempts to refresh the block or, if necessary, to reassign the data to an alternate block.

Figure 6:
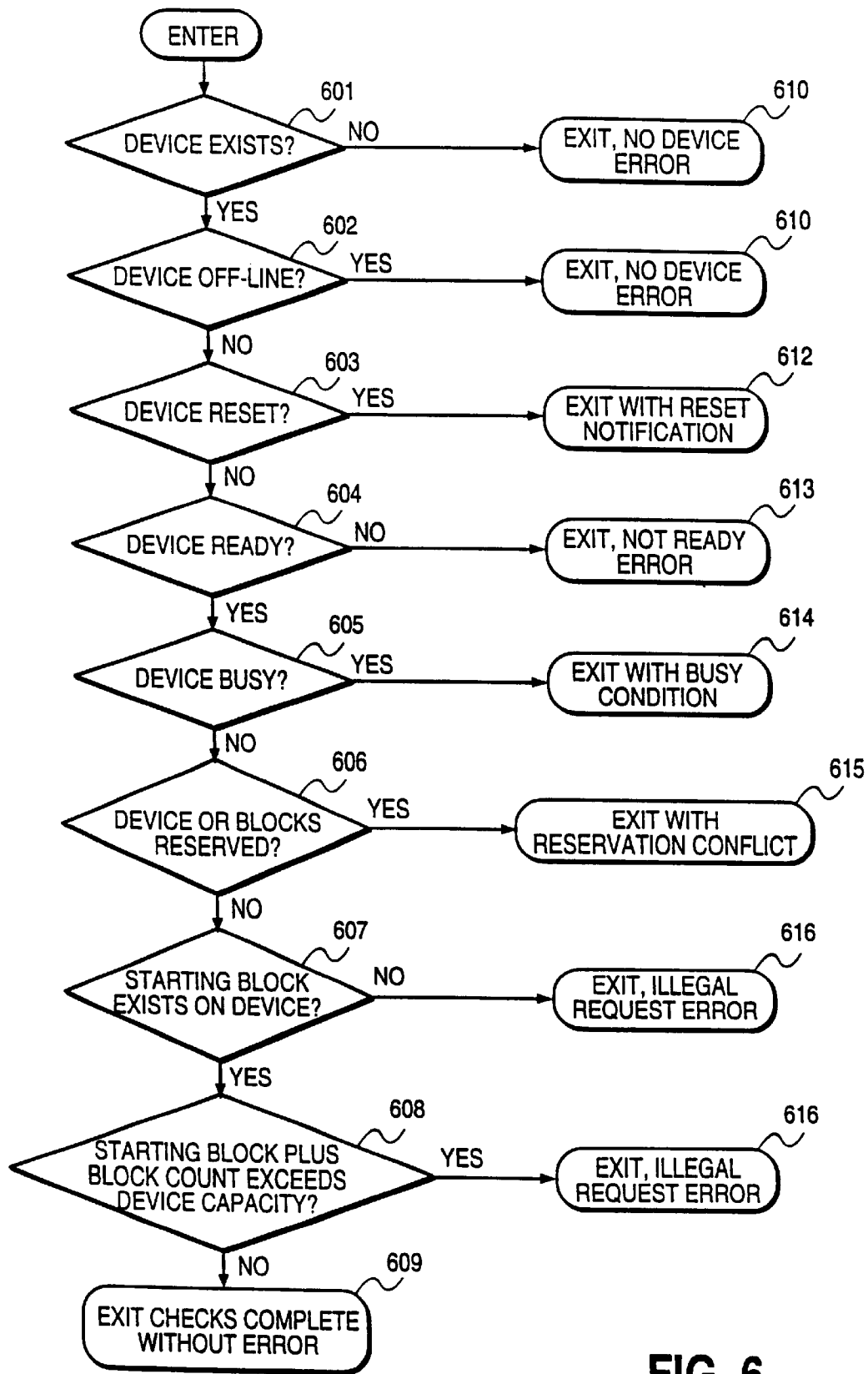
FIG. 6 is a flow diagram illustrating a check routine performed in response to an input/output request.

In response to each I/O request (read or write) from a host, the storage controller performs a series of standard checks before carrying out the operation. FIG. 6 illustrates a routine for performing the standard checks. It is first determined, in step 601, whether the storage device identified by the host exists. As noted above, this device will be a virtual device. The method of identifying the physical MSD to be accessed is discussed below. If the device does exist, then the routine proceeds to step 602. Otherwise, the routine exits in step 610 with a "no device" error being provided to the host. If the device exists, then in step 602, it is determined whether the device to be accessed is off-line. If not, the routine proceeds to step 603. If the device is off-line, the routine exits in step 610 with a "no device" error being provided to the host. If the device is not off-line, then in step 603, it is determined whether the device has been reset. If so, the routine exits in step 612 with a reset notification being provided to the host. If the device has not been reset, then the routine proceeds to step 604, in which it is determined whether the device is ready. If the device is not ready, then in step 613 the routine exits with a "not ready" error being provided to the host. If the device is ready, then in step 605 it is determined whether the device is busy. If so, the routine exits in step 614 with the setting of a "busy" condition flag. If the device is not busy, then in step 606 it is determined whether the device or particular blocks to be accessed are reserved. If so, the routine exits in step 615 with a "reservation conflict" error being provided to the host. If the device or blocks to be accessed are not reserved, then in step 607 it is determined whether the starting block of the file to be accessed exists on the device. If not, the routine exits in step 616 with an "illegal request" error being provided to the host. If starting block exists on the device, then it is determined in step 608 whether the starting block-plus-block count exceeds the device capacity. If so, the routine exits in step 616 with an "illegal request" error being provided to the host. Otherwise, the routine exits in step 609 with a "checks complete without error" condition being provided to the host.

As mentioned above, the storage controllers use virtual-to-real device mapping to provide transparency of I/O operations to the host computers, as will now be described. A single host (virtual) address may map to a single physical address, or, to improve performance, the storage controller may map a single host address to multiple physical addresses, which may be distributed among multiple MSDs located in different storage arrays. A storage controller maps a host address to one or more physical addresses using a two-part process that is transparent to all hosts. Specifically, a host address received from a host computer system is first mapped to a logical address, and the logical address is then mapped to a physical (real) address in one or more MSDs.

Figure 7:
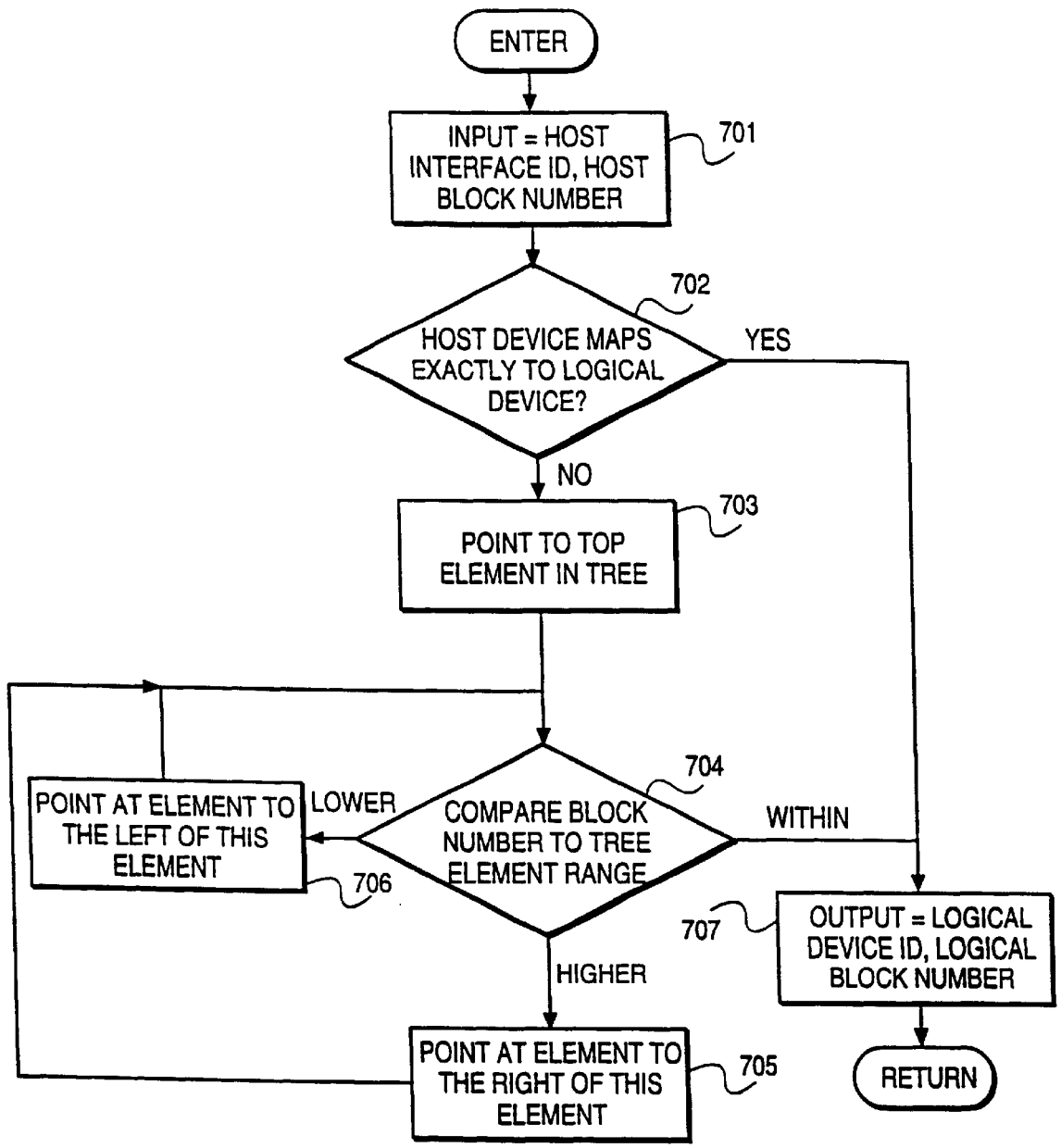
FIG. 7 is a flow diagram illustrating a routine for mapping a host address to a logical address.

FIG. 7 illustrates the process of mapping a virtual address to a logical address. Because a given storage controller may have an interface with more than one host or multiple paths to the same host, each host address includes a host interface identifier (ID) that identifies the particular host or redundant path with which the access request is associated. Hence, in step 701, the storage controller receives a host interface ID and a host (memory) block number. In step 702, the storage controller determines whether the host device ID and block number map exactly to a logical device. This determination can be made by checking the status of a single bit representing whether or not the mapping is exact.

Figure 8:
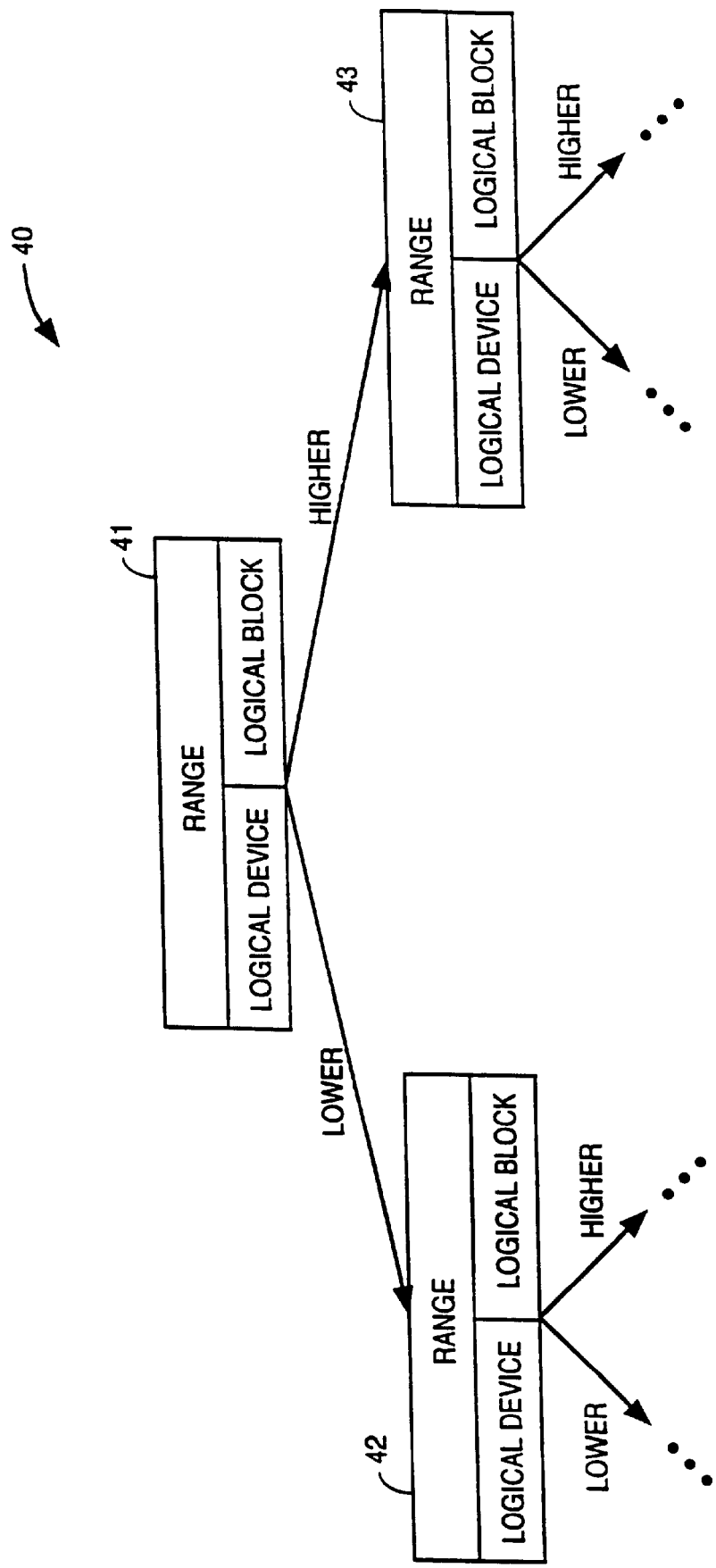
FIG. 8 illustrates a tree hierarchy used by a storage controller to map a host address to a logical address.

The storage controller maintains and uses a tree structure such as that illustrated in FIG. 8 to map the host interface ID and block number to a logical device. The tree structure 40 of FIG. 8 comprises a number of elements 41, 42 and 43. Each element includes a field designating a range of memory blocks as well as pointers to both a logical device and a logical block for that range. In addition, each element includes a pointer to another element corresponding to a different memory range. For example, the range of memory blocks represented by element 42 may be a lower range than that represented by element 41. Accordingly, element 41 would include a pointer to element 42 which is designated as a pointer to lower memory ranges. Similarly, element 43 may correspond to a range of memory blocks that is higher than the range of element 41. Accordingly, element 41 includes a pointer to element 43 which is identified as a pointer to higher memory ranges. Each element in the tree structure 40 similarly includes pointers to elements representing lower and higher memory ranges (except for elements in the bottom-most level of the tree).

Hence, referring again to FIG. 7, if it is determined in step 702 that the mapping between the host device and the logical device is exact, then in step 707 the output of the process is simply a logical device ID and a logical block number. If there is not an exact mapping, however, then in step 703 the process accesses the top element (e.g., element 41 in FIG. 8) in the virtual-to-logical mapping tree structure. In step 704, the host block number is compared to the element range in the top element in the tree. If the host block number falls below that range, then the process points to the element representing the next lower range (e.g., element 42 in FIG. 8) in step 706; step 704 is then repeated. If, in step 704, the host block number falls higher than the range of the top element in the tree, then in step 705 the process points to the element in the tree representing the next higher range (e.g., element 43 in FIG. 8); the process then repeats from step 704. If the block number is determined to fall within the range of the top (or current) element in the tree in step 704, then the process proceeds to step 707 by outputting the logical device and logical block number in the top (or current) element.

Figure 9:
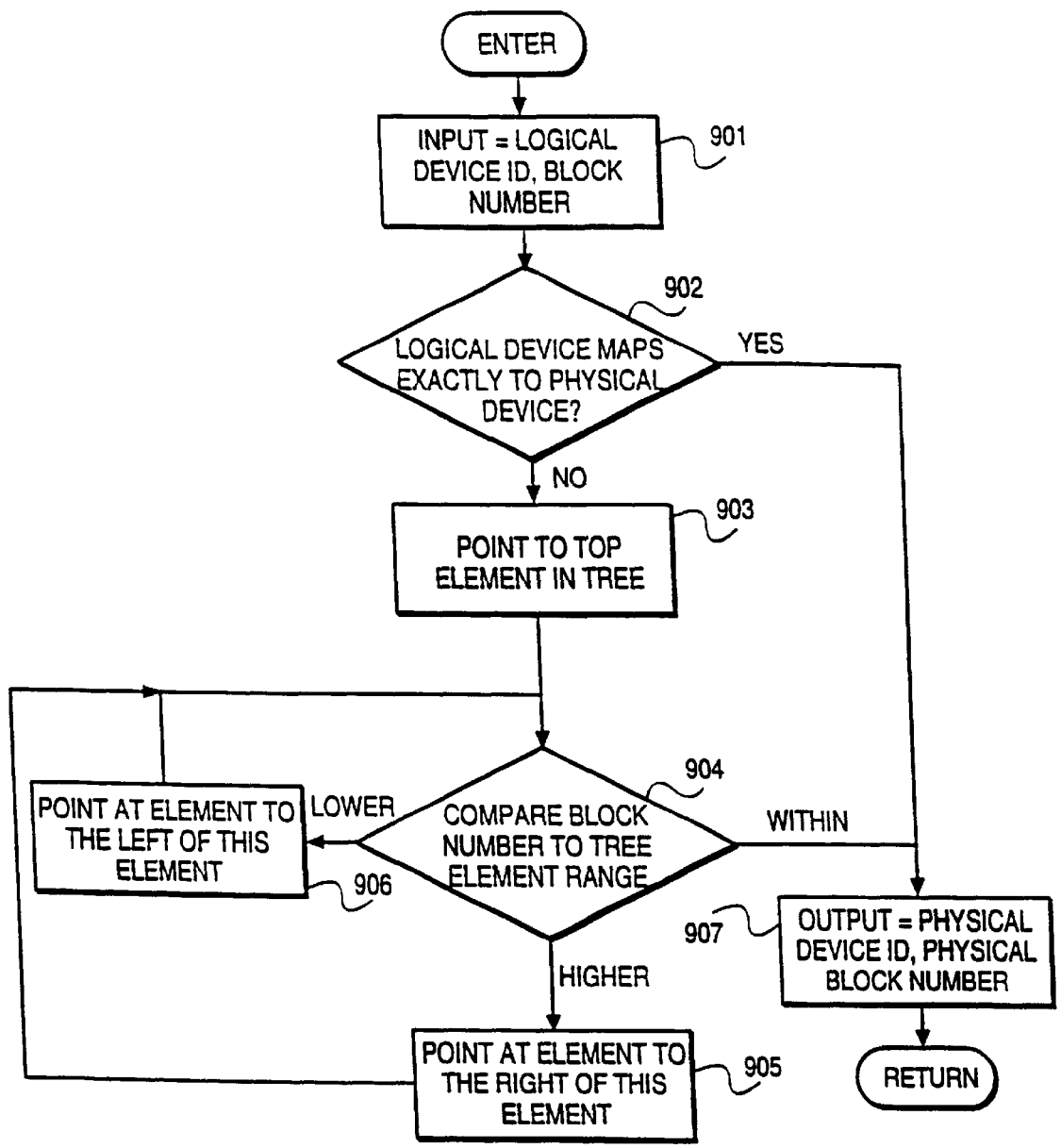
FIG. 9 is a flow diagram illustrating a routine for mapping a logical address to a physical address.

FIG. 9 illustrates the second part of the address mapping process, in which a logical address is mapped to a physical address. In step 901, the logical device ID and logical block number determined in the host-to-logical mapping process (FIG. 7) is input. In step 902, the storage controller determines whether the logical device maps exactly to the physical device. As in the above-described routine, this determination can be made based upon the status of a single bit. If the mapping is exact, then the process proceeds to step 907, in which the appropriate physical device ID and physical block number are output. Otherwise, the process proceeds to step 903, in which the routine points to the top element of a logical-to-physical mapping tree. The logical-to-physical mapping tree is similar in structure to, and is accessed in essentially the same manner as, the host-to-logical mapping tree of FIG. 8. In step 904, the logical block number is compared to the element range in the top element in the tree. If the logical block number falls below that range, then the process points to the element representing the next lower range in step 906; step 904 is then repeated. If the logical block number falls higher than the range of the top element in the tree in step 904, then in step 905 the process points to the element in the tree representing the next higher range; the process then repeats from step 904. If the block number is determined to fall within the range of the top (or current) element in the tree in step 904, then the process proceeds to step 907 by outputting the correct physical device and physical block number in the top (or current) element.

At various times, the storage controller must read data from one or more MSDs into its internal memory ("the cache") or transfer data from the cache to one or more MSDs; these procedures are known as "staging" and "destaging", respectively. Staging is generally performed, for example, when executing a host read request. Destaging is generally performed when executing a host write request.

Figure 10:
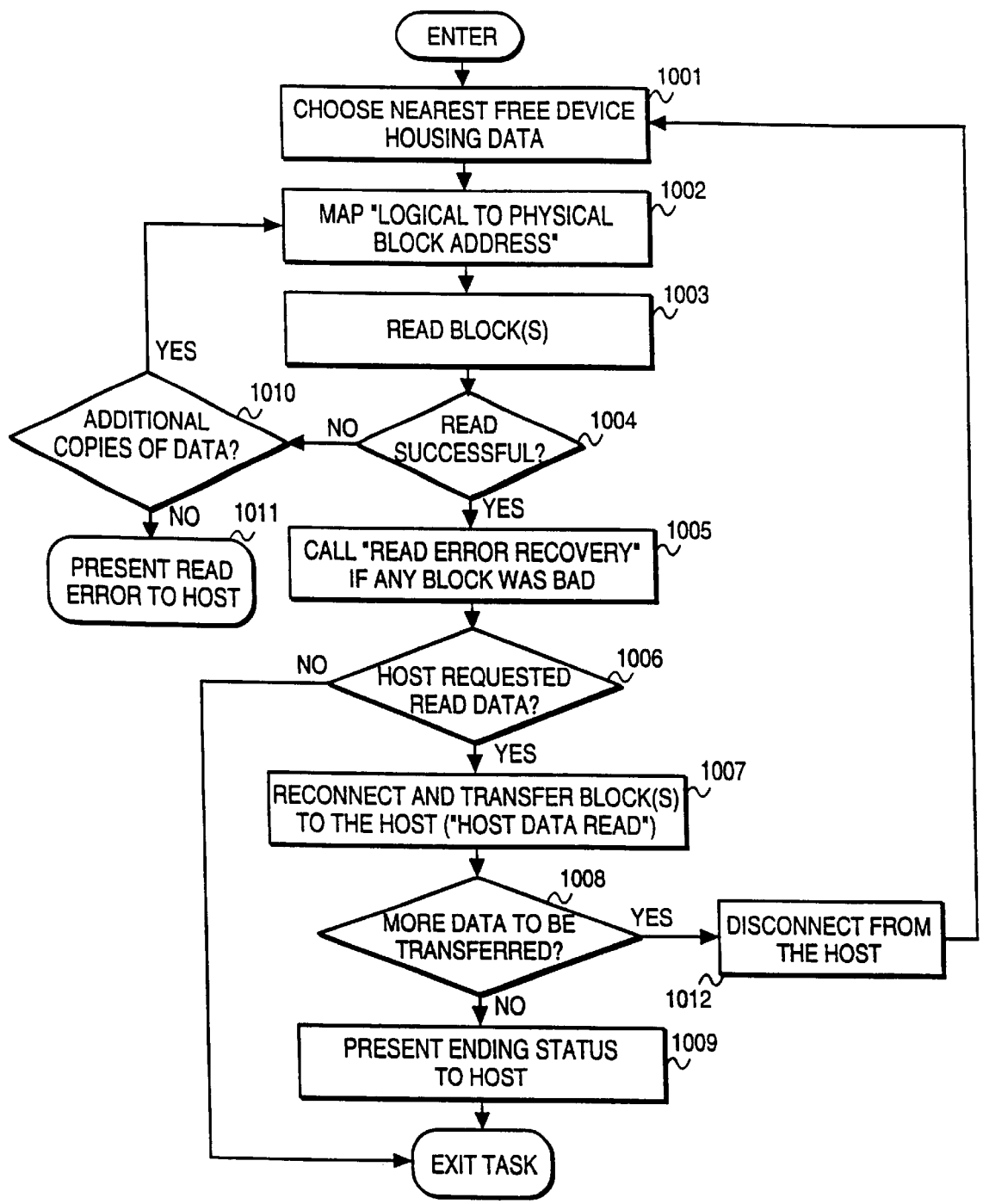
FIG. 10 is a flow diagram illustrating a routine for staging data from a mass storage device.

FIG. 10 illustrates a routine for staging data, which can be performed by a storage controller of the present invention. In step 1001, the storage controller selects the "nearest" free device housing the data of interest. In this context, the term "nearest" refers to the mass storage device associated with the smallest overall access time or earliest availability, rather than referring to physical distance. (Note, however, that physical distance may be a factor in the total access time.) In a given situation, the nearest storage device may be the local memory within the local storage controller, an MSD within the local storage array, or an MSD within a remote storage array. After selecting the nearest free device, in step 1002 the logical block address of the data is mapped to a physical block address in the manner described above. In step 1003, the block or blocks are read from the selected device using the physical block address. If the read is successful (step 1004), then in step 1005 a read error recovery routine is called if any block was bad. The read error recovery routine is discussed below in connection with FIG. 11. If the read is not successful, and no additional copies of the data are available (step 1010), then a read error message is presented to the host and the routine exits in step 1011. If the read was unsuccessful and additional copies are available, then the routine repeats from step 1002 by mapping the block of the next available copy to a physical block. After a successful read (step 1004), and after calling the read error recovery routine if necessary (step 1005), then in step 1006 it is determined whether the staged data was requested by the host; if not, the routine exits. If so, the storage controller reconnects to the host (i.e., acquires exclusive use of communication link 8, which may be a SCSI bus) and transfers the block or blocks to the host in step 1007. If there is more data to be transferred (step 1008), then the storage controller disconnects from the host in step 1012, and the routine then repeats from step 1001. The storage controller disconnects from the host at this time because it is desirable not to monopolize the link 8 with the host while accessing the additional data. If there is no more data to be transferred, then an ending status message is presented to the host in step 1009, and the routine then exits.

Figure 11:
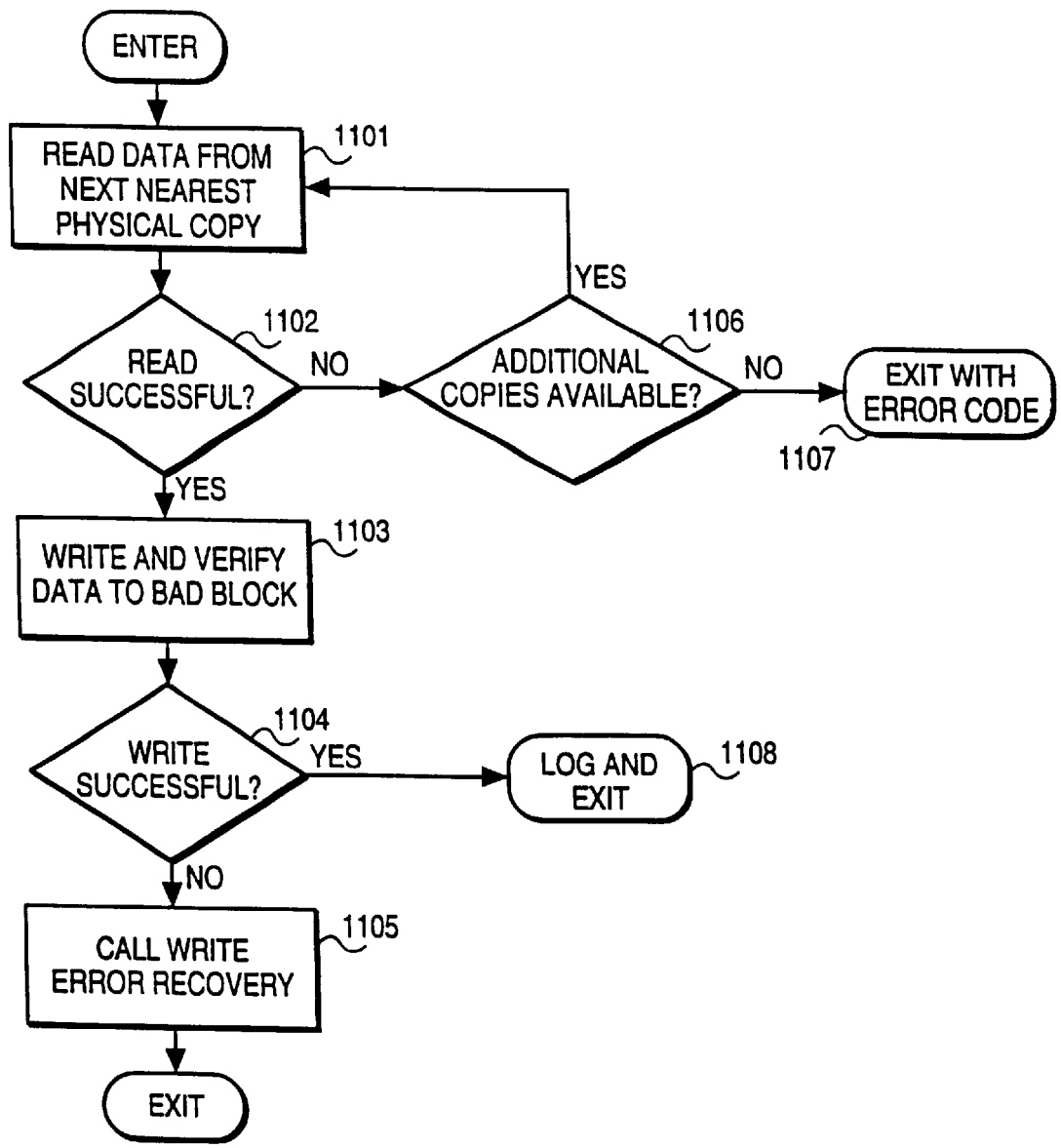
FIG. 11 is a flow diagram illustrating a read error recovery routine.

FIG. 11 illustrates the read error recovery routine. In response to a read error, in step 1101 the data of interest is read from the next-nearest physical copy. Again, "nearest" refers to overall access time or earliest availability, rather than physical distance. If the read is successful (step 1102), then an attempt is made in step 1103 to write the data to the bad block and to verify the write operation (i.e., to refresh the data block). If the write is successful (step 1104), then that fact is logged in step 1108, and the routine exits. If the attempt to rewrite the data is unsuccessful, then a write error recovery routine is called in step 1105, after which the routine exits. The write error recovery routine is discussed below in connection with FIG. 13. If the read operation (step 1101) is unsuccessful, and if no additional copies are available (step 1106), the routine exits in step 1107 with an error code presented to the host. If additional copies are available after an unsuccessful read, then the routine repeats from step 1101 using the next-nearest physical copy.

Figure 12:
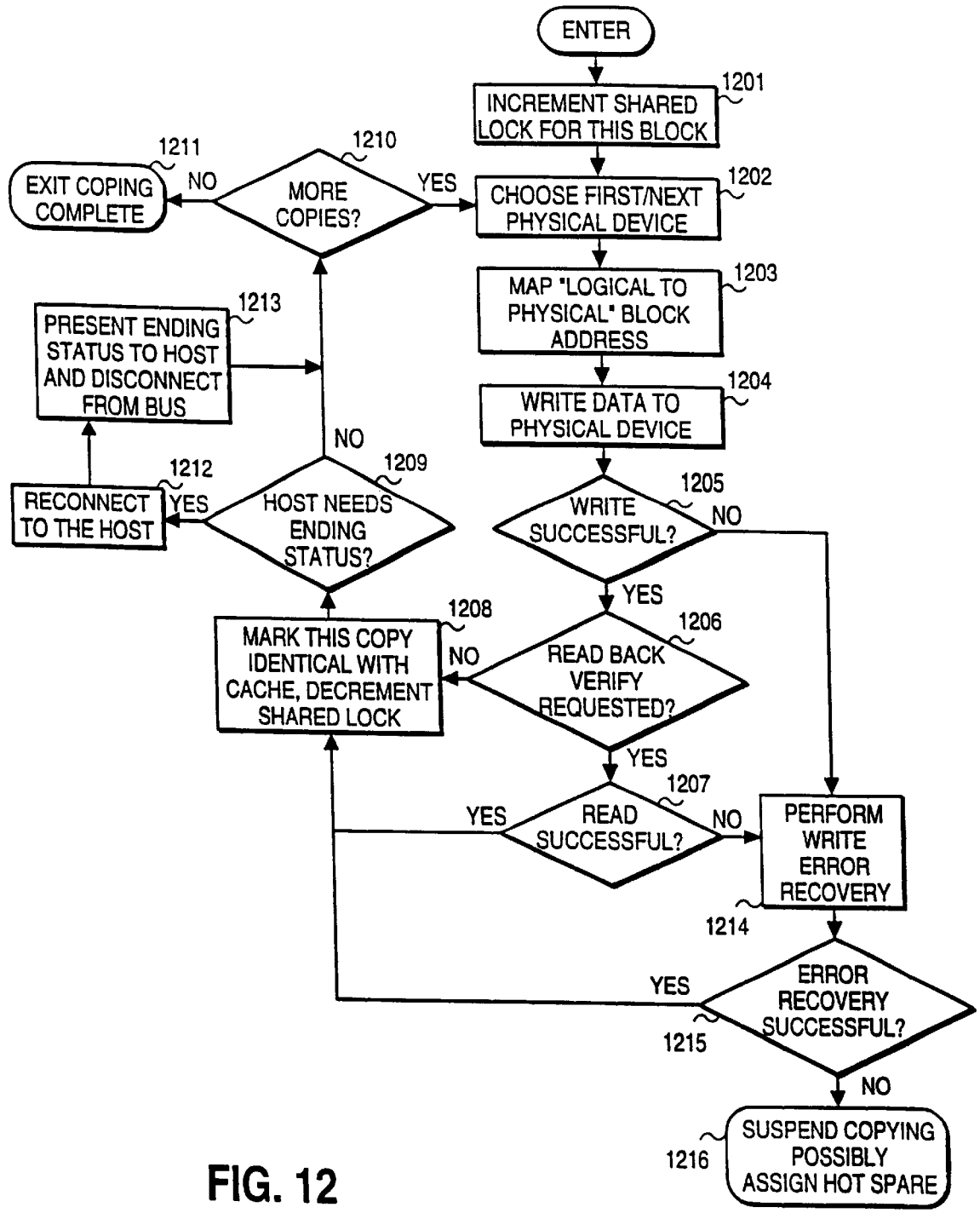
FIG. 12 is a flow diagram illustrating a routine for destaging data to a mass storage device.

FIG. 12 illustrates a routine for destaging data. It is appropriate at this point to consider certain signals that are used in conjunction with destaging. Associated with each block of data are two single-bit binary quantities, namely, Exclusive Lock and Shared Lock. Only a single device is permitted access to a given block of data for purposes of performing a write operation; this constraint is implemented using Exclusive Lock. A write on a block is performed by obtaining an Exclusive Lock on that block. For purposes of writing to a block, Exclusive Lock for that block can be set for only if neither Shared Lock nor Exclusive Lock is already set. When a write operation on a block is initiated, Exclusive Lock is set for that block, so that no other device may access that block during the write operation. In contrast, multiple devices are permitted to read from a given block of data at the same time. A read on a block is performed by obtaining a Shared Lock on that block. A device may obtain a Shared Lock on a data block, regardless of the current status of Shared Lock, provided Exclusive Lock for that block is not already set. When a read is initiated on a given block, Shared Lock for that block is set, so that no device may write to that block during the read operation.

The storage controller can optionally be configured to delay and "merge" multiple destaging tasks to avoid multiple updates of the same physical blocks. In other words, instead of executing each destaging task, the storage controller may simply accumulate and log several destaging tasks in internal memory without executing them, and then subsequently perform a single "merged" destaging task to implement the aggregate effect of the accumulated destaging tasks.

Referring now to FIG. 12, when destaging is to be performed with respect to a given block, then Shared Lock for that block is set in step 1201. In step 1202, the first (or next) physical device is selected. In step 1203, the logical block address is mapped to a physical block address in the manner described above. In step 1204 the data is written to the physical device identified in step 1203. If the write is successful (step 1205), and if no read back verification was requested (step 1206), then in step 1208 the copy is marked as identical with that stored in the cache, and Shared Lock is cleared. It is desirable to mark a copy as identical with that stored in the cache in order to keep an accurate map of consistency between copies. If the write is not successful, then in step 1214 a call is made to the write error recovery routine. If error recovery is successful (step 1215), then the routine proceeds to step 1208 (described above). Otherwise, copying is suspended and a "hot spare" is assigned (if available) in step 1216, and the routine exits. Note that strict adherence to the ordering of steps shown in FIG. 12 is not required in order to perform destaging according to the present invention; hence, multiple copies of data can be written simultaneously during destaging.

Following step 1208, it is next determined whether a host requires an ending status message (step 1209). If not, and if there are no additional copies stored in physical storage (step 1210), then the routine exits in step 1211. If no ending status is required by a host (step 1209), and there are additional copies (step 1210), then the routine repeats from step 1202 with selection of the next physical device. If there are no additional copies, the routine exits as in step 1211. If ending status is required by a host (step 1209), then in step 1212 the storage controller reconnects to the host (reacquires possession of the bus 8). Ending status is then presented to the host and the storage controller disconnects from the bus in step 1213. The routine then proceeds from step 1210.

Figure 13:
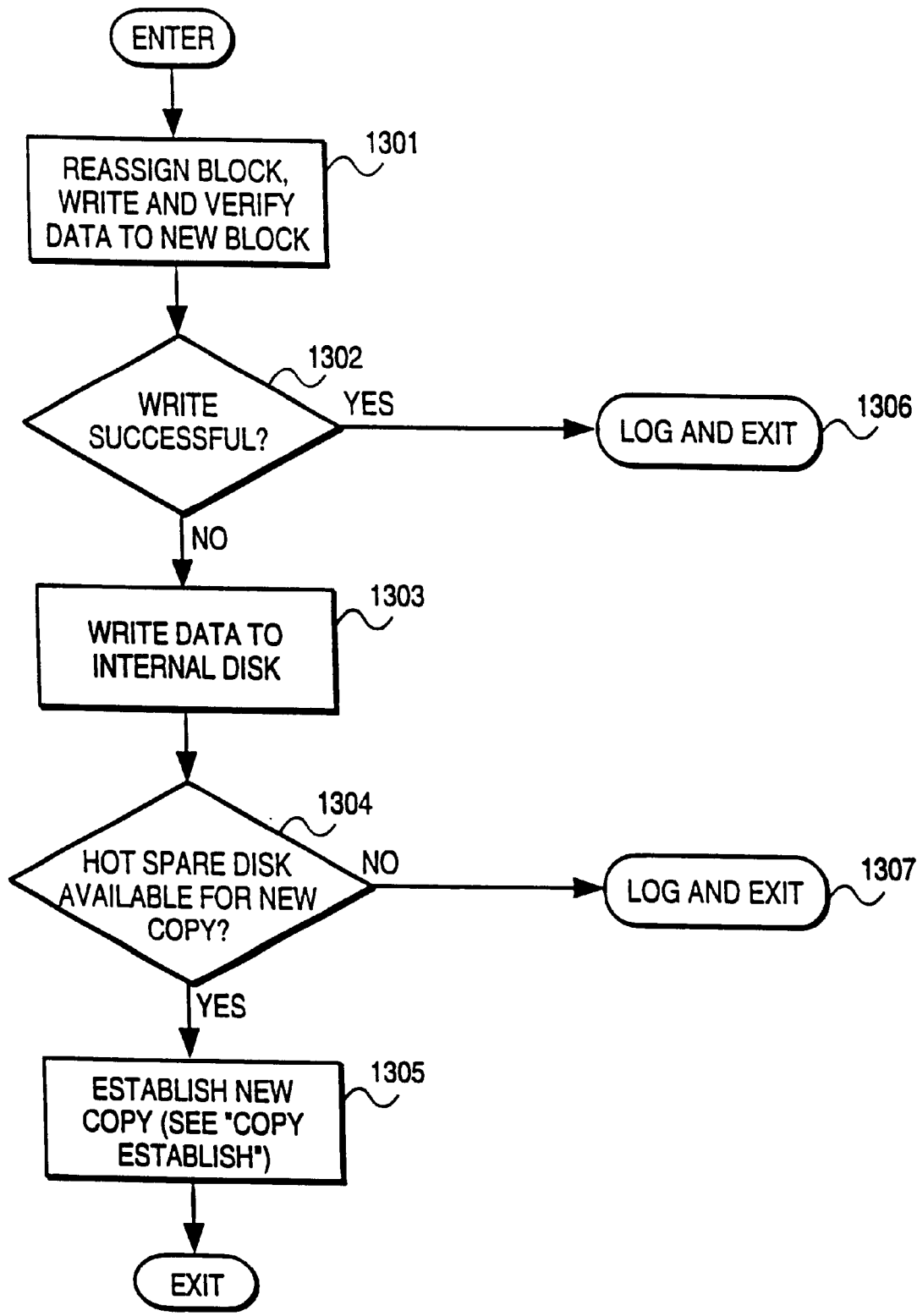
FIG. 13 is a flow diagram illustrating a write error recovery routine.

FIG. 13 illustrates the write error recovery routine. In response to a write error, in step 1301 the faulty block is reassigned and written to a new block; this step is accompanied by verification of the write operation. If the write is successful (step 1302), then in step 1306 the new location of the block is logged and the routine exits. If the write was not successful, then the data is written to the internal MSD (i.e., MSD 13 in FIG. 3) in step 1303. Note that the internal MSD of the storage controller is generally not accessible to a host. After writing to the internal MSD, it is determined in step 1304 whether a hot spare MSD is available for the new copy. If no hot spare is available, then in step 1307 the location of the data is logged and the routine exits. If a hot spare is available, then in step 1305 an "establish" routine is performed to establish a new copy of the data on the hot spare. The establish routine is discussed below in connection with FIG. 18. The routine exits after establishing the new copy.

Figure 14:
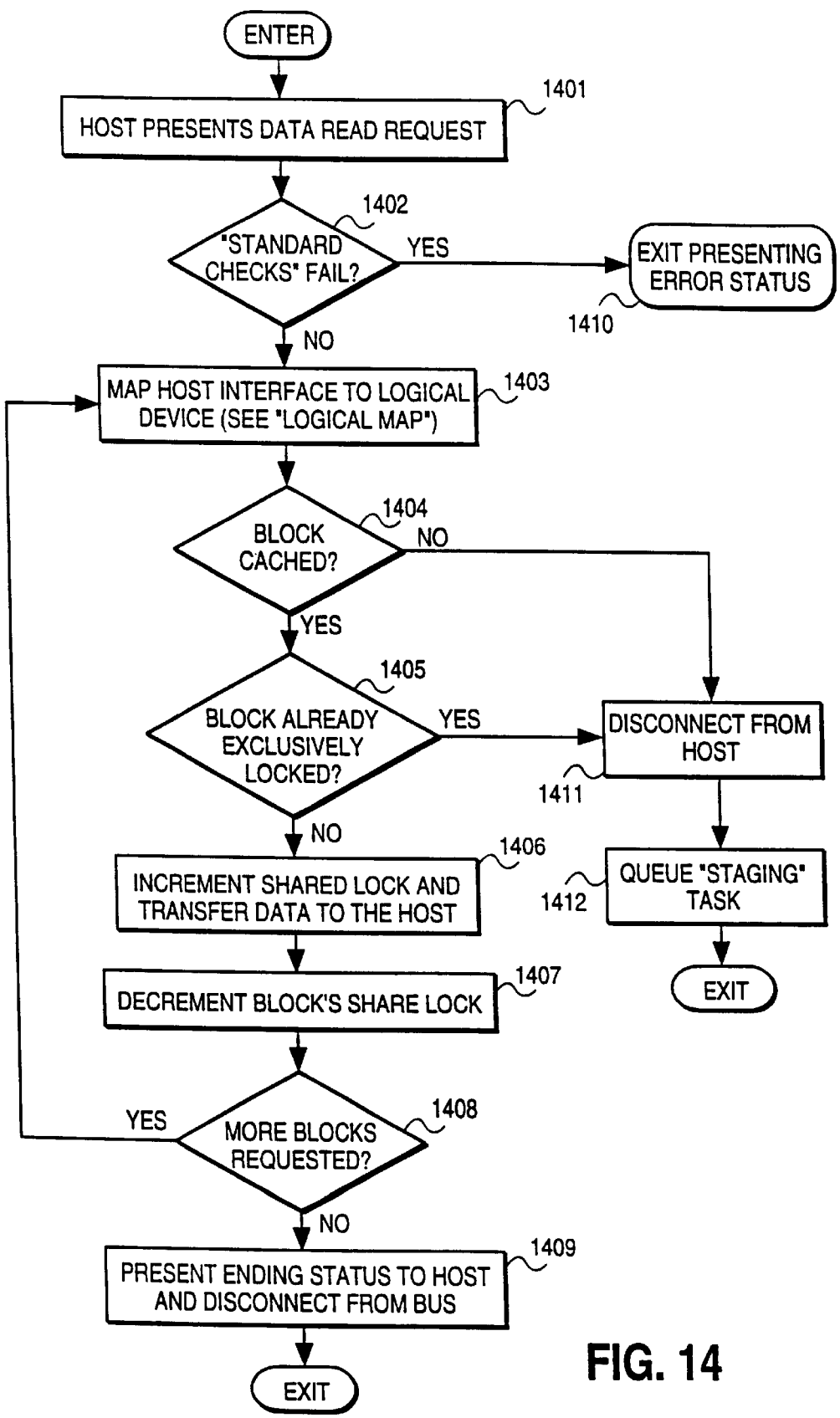
FIG. 14 is a flow diagram illustrating a routine for reading data from a mass storage device in response to a request from a host.

FIG. 14 illustrates a routine for performing a standard read operation in response to a request by a host. In step 1401, a storage controller receives a data read request from a host. Next, in step 1402 the standard checks routine (see FIG. 6) is performed. If any of the standards checks fail, then the routine exits in step 1410, presenting an error status message to the host. If none of the standard checks fail, then in step 1403 the storage controller identifies the appropriate logical device based on the host interface and virtual block number received from the host in step 1403. This is done in the manner discussed above in connection with FIG. 8. Next, if the requested block is cached (stored in the storage controller's internal memory 24), then it is determined in step 1405 whether Exclusive Lock is set for the requested block. If Exclusive Lock is set or if the block was not cached, then in step 1411 the storage controller disconnects from the host, and in step 1412 a staging task is queued. The routine exists after queuing a staging task. If Exclusive Lock was not set in step 1405, then in step 1406 Shared Lock is set and the data is transferred to the host from the cache. After transferring the data to the host, Shared Lock is cleared in step 1407. Then, it is determined in step 1408 whether additional blocks have been requested. If so, the routine repeats from step 1403. If no additional blocks have been requested, then in step 1409 an ending status message is presented to the host, and the storage controller disconnects from the bus 8. The routine then exits.

As noted above, the storage controller may maintain multiple copies of a given set of data on different MSDs (which fact may be transparent to the hosts). Consequently, to improve performance, the storage controller can optionally be configured to concurrently read different subsets (i.e., blocks) of the set of data from different copies stored on different devices. This technique, which may be referred to as "spreading" reads, may reduce the overall time required to read the complete set of data in some cases.

Figure 15:
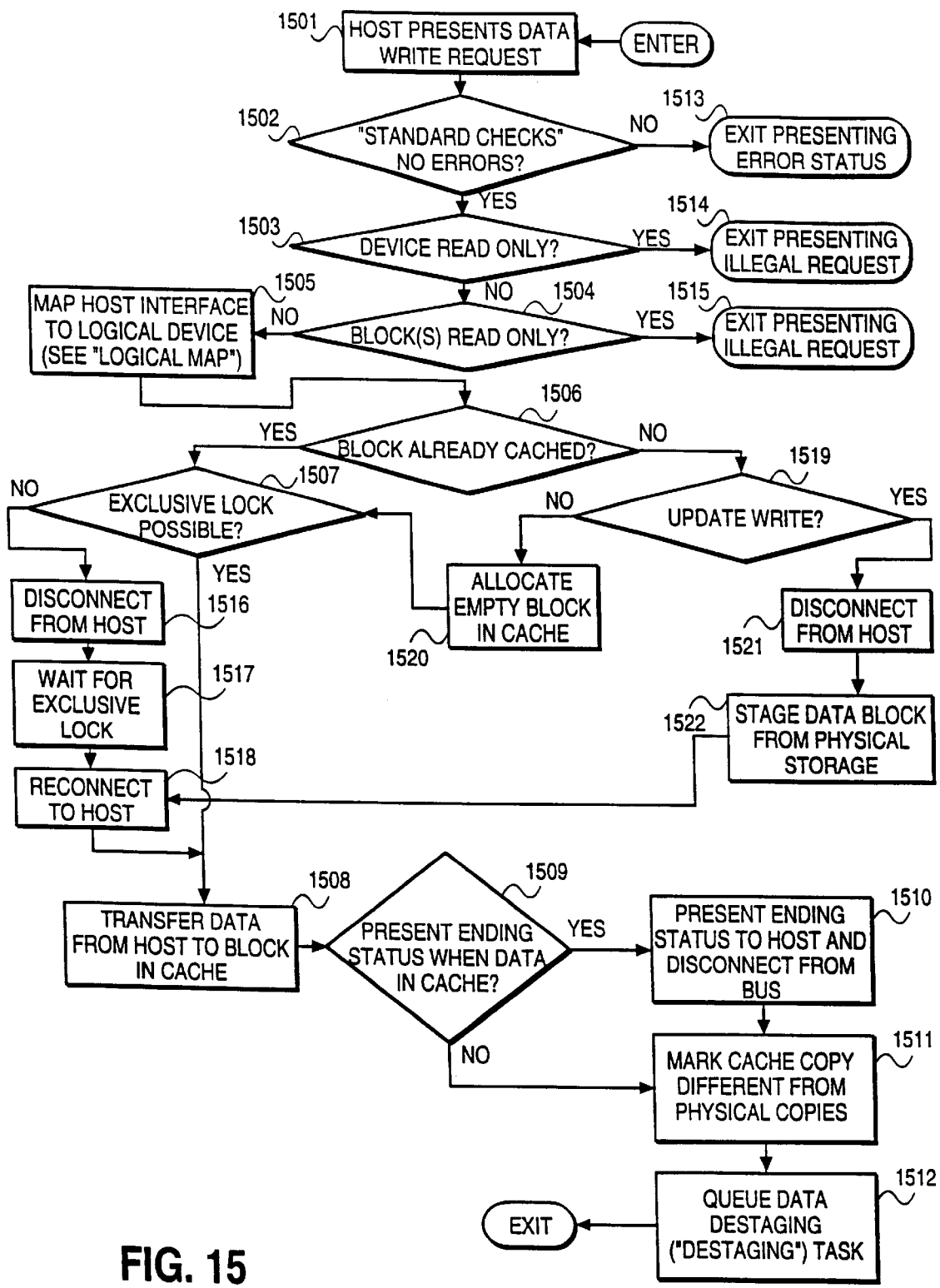
FIG. 15 is a flow diagram illustrating a routine for writing data to a mass storage device in response to a request from a host.

FIG. 15 illustrates a routine for performing a standard write operation in response to a request from a host. In step 1501, the storage controller receives a write request from a host. Next, in step 1502 the standard checks (FIG. 6) are performed. If any of the standard checks fail, then the routine exits in step 1513, presenting an error status message to the host. Assuming none of the standard checks fail, then in steps 1503 and 1504, respectively, it is determined whether the device or blocks to be written to are designated as read-only. If the device or any of the blocks are read-only, then the routine exits, presenting an "illegal request" message to the host (steps 1514 and 1515). If neither the device nor any block is read-only, then in step 1505 the storage controller maps the host interface to the appropriate logical device using the technique described above (FIG. 7). After identifying the appropriate logical device, it is determined in step 1506 whether the block is already cached in the storage controller's internal memory 24. If the block is already cached, then in step 1507 it is determined whether it possible to obtain Exclusive Lock on the requested block. As noted above, in order to obtain Exclusive Lock, neither Shared Lock nor Exclusive Lock for that block can be set. If Exclusive Lock can be obtained, then in step 1508 the data is transferred from the host to the appropriate block in the internal memory 24. If Exclusive Lock is not possible, then in step 1516 the storage controller disconnects from the host and waits for Exclusive Lock in step 1517. Once Exclusive Lock is obtained, then in step 1518 the storage controller reconnects to the host and, in step 1508, transfers the data from the host to the internal memory 24, as described above.

Referring again to step 1506, if the block to be written was not already cached, then in step 1519 it is determined whether the write operation is an update write (i.e., the writing of a partial block). With SCSI protocol, partial blocks cannot be written; only complete blocks can be written. However, other protocols which might be used in conjunction with the present invention might permit an update write. Accordingly, if the requested write operation is not an update write, then in step 1520 an empty block is allocated in the internal cache and the routine proceeds to step 1507 by obtaining Exclusive Lock, if possible. If the requested write operation is an update write, then in step 1521 the storage controller disconnects from the host. After disconnecting from the host, the storage controller stages the block from physical storage in step 1522 and then reconnects to the host in step 1518. The data is then transferred from the host to the appropriate block in the internal memory 24 in step 1508, as described above. Note that the process of disconnecting from the host while staging a block to be updated (steps 1521 and 1522) may be performed by an asynchronous task.

After a block is transferred from the host to the internal memory 24 in step 1508, then if an ending status message is required (step 1509), the status message is presented to the host and the storage controller disconnects from the bus 8 in step 1510. After disconnecting from the bus in step 1510, or if no ending status message was required, then in step 1511 the cache copy is marked as different from the physical copies. Next, in step 1512 a destaging task is queued, and the routine exits.

As in the case of a read operation, if multiple copies are maintained, the storage controller can optionally be configured to concurrently write different portions of a data set to different copies stored on different devices (i.e., "spread" the writes) in order to improve performance. Also, the storage controller can be configured to "simulate" a write to an MSD without actually writing to a physical device for certain cases. This procedure may be desirable for purposes of writing temporary data, such as data generated only for a specific job. In such cases, the storage controller simply writes the data to its internal memory 24 and then, if required, presents ending status to the host.

Figure 16:
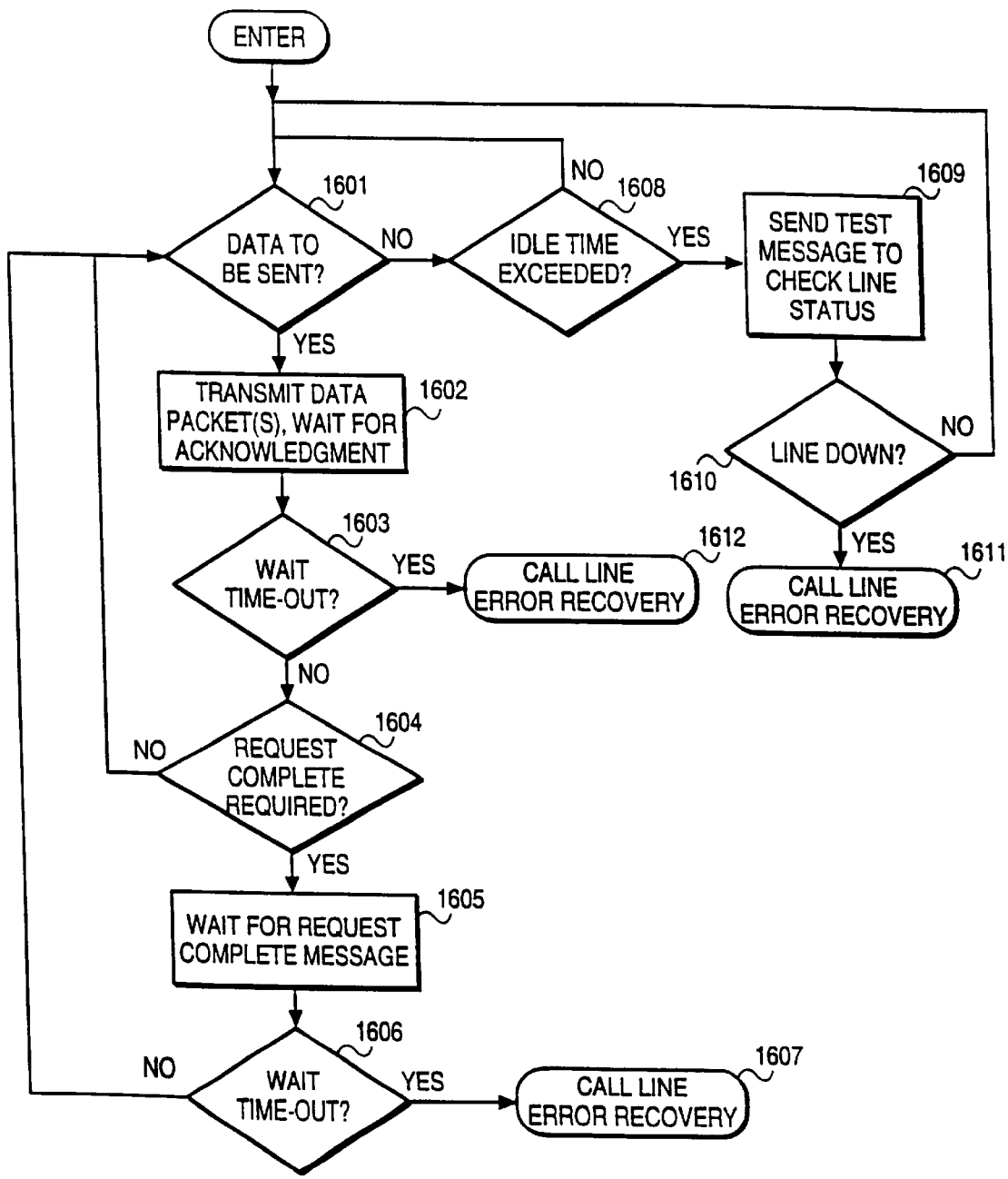
FIG. 16 is a flow diagram illustrating a routine for transmitting data to a remote storage controller.

As mentioned above, a local storage controller of the present invention can communicate with one or more remote storage controllers for purposes of accessing a remote storage array. FIG. 16 illustrates a routine which can be performed by a local storage controller for transferring data to a remote storage controller. If there is data to be sent (step 1601) to a remote storage controller, then in step 1602 the local storage controller transmits the data onto the link 9 in packet form and waits for an acknowledgment from the remote storage controller. If a wait time-out occurs (step 1603) before an acknowledgment is received, then in step 1612 a line error recovery routine is called. The line error recovery routine is discussed below in connection with FIG. 17. If no wait time-out occurs before the acknowledgment is received, then if a request complete message is required by the host (step 1604) the storage controller waits in step 1605 for a "request complete" message from the remote storage controller. If no "request complete" message is received before a wait time-out occurs (step 1606), then the storage controller calls the line error recovery routine in step 1607. If no "request complete" message is required, or if no time-out occurs before the "request complete" message arrives, the routine repeats from step 1601.

Figure 17:
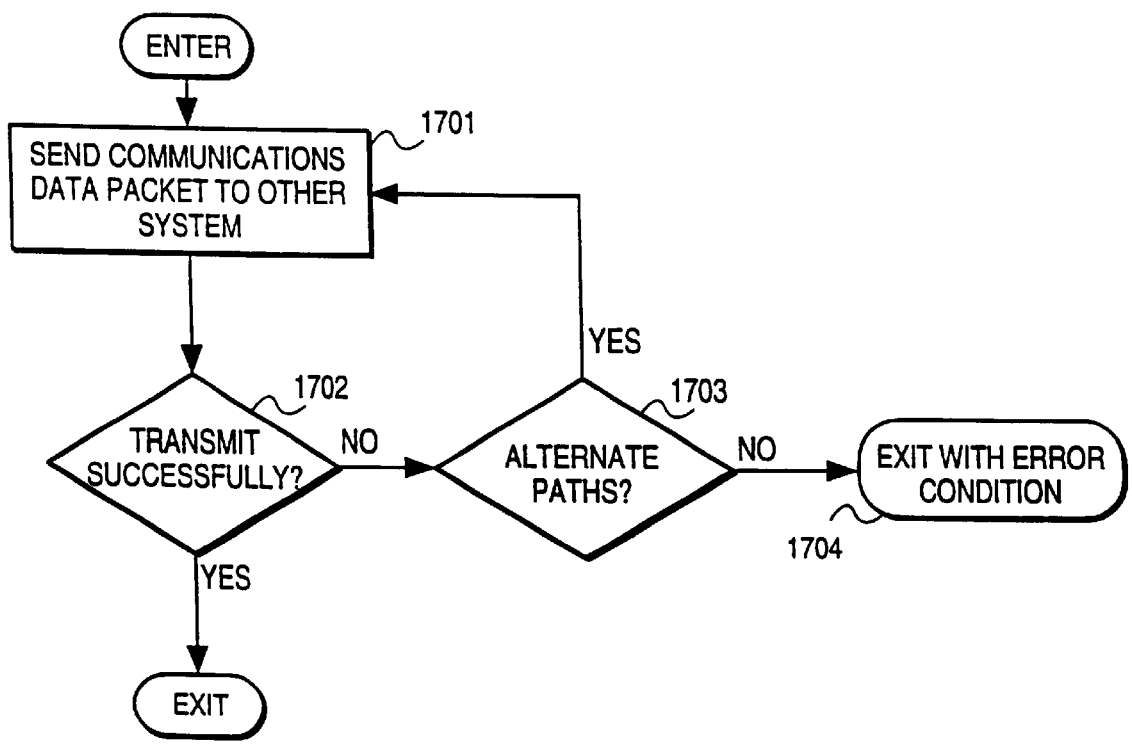
FIG. 17 is a flow diagram illustrating a remote communications error recovery routine.

FIG. 17 illustrates the line error recovery routine. In step 1701, a communications data packet is sent to the remote storage controller. If the transmission is successful (step 1702), then if alternate paths to that storage controller exist (step 1703), the routine repeats from step 1701 using an alternate path. Otherwise, the routine exits in step 1704 with the notification of an error condition. If the transmission was successful in step 1702, then the routine exits.

Figure 18:
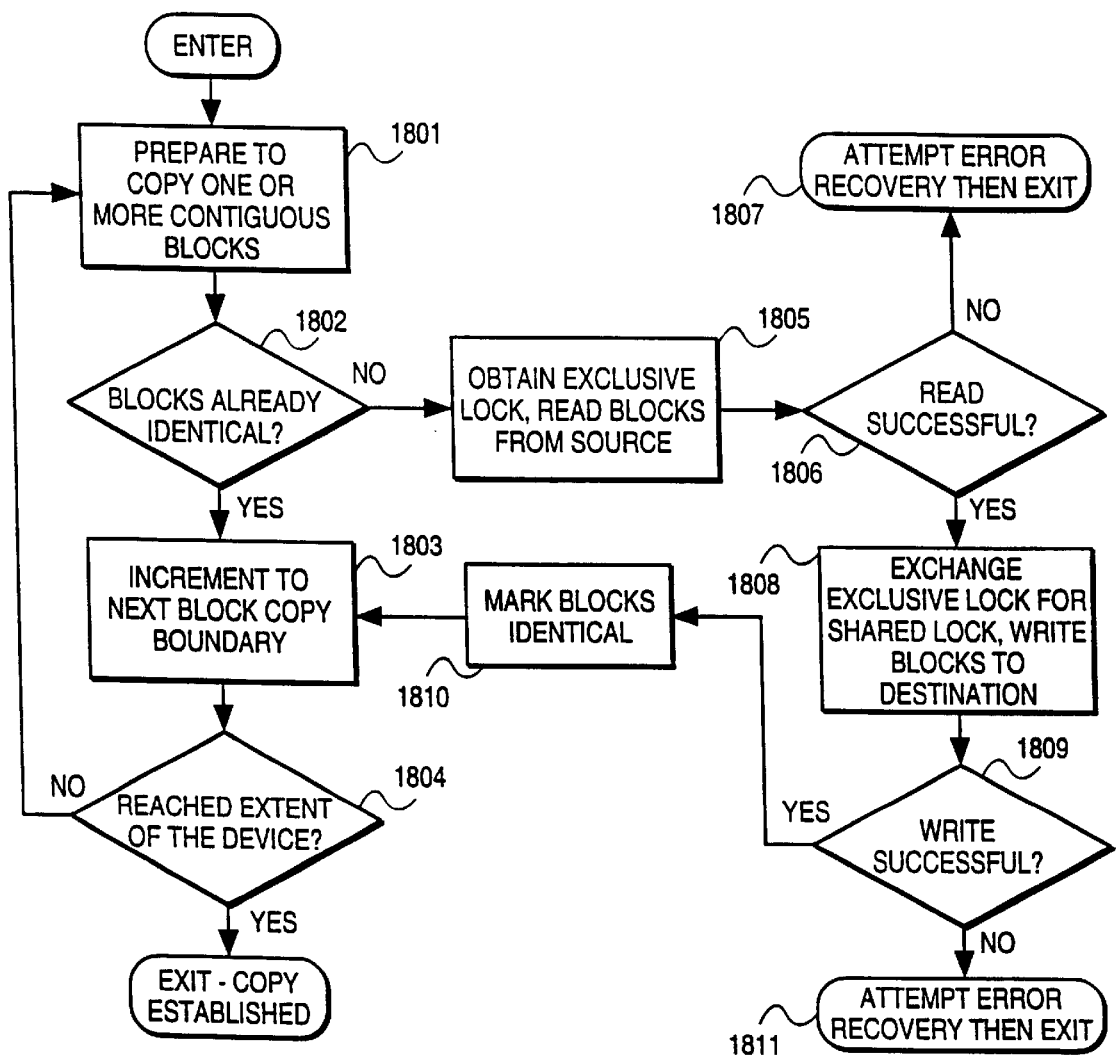
FIG. 18 is a flow diagram illustrating a routine for establishing copies.

FIG. 18 illustrates the establish routine for establishing (ensuring consistency between) copies. Assume now that at least one copy of a given file has already been created from an "original" (which may be a previously-created copy). In step 1801, the storage controller identifies one or more contiguous blocks of data in the file. In step 1802, it is determined whether the corresponding blocks are identical between the original and the copy. If so, then in step 1803 one or more other contiguous blocks of data are examined, starting from the next block copy boundary. Next, in step 1804, if the extent of the storage device has not been reached, then the routine repeats from step 1801. If the extent of the device has been reached, then the copy has been established and the routine exits. If the blocks are determined not to be identical in step 1802, then in step 1805 the storage controller obtains (sets) Exclusive Lock for each of those blocks and reads the blocks from the source file. If the read is successful (step 1806), then Exclusive Lock is exchanged for Shared Lock and the blocks are written to the destination device in step 1808. If the read was not successful, then in step 1807 the read error recovery routine is called. After exchanging Exclusive Lock for Shared Lock and writing to the destination (step 808), in step 1809 it is determined whether the write was successful. If not, the write error recovery routine is called in step 1811. If the write was successful, then in step 1810 the corresponding blocks of the two different copies are marked as identical and the routine proceeds from step 1803 (described above). Note that during the establish routine double buffering may occur; that is, one or more subsequent reads may overlap in time with previous writes in order to improve performance.

Figure 19:
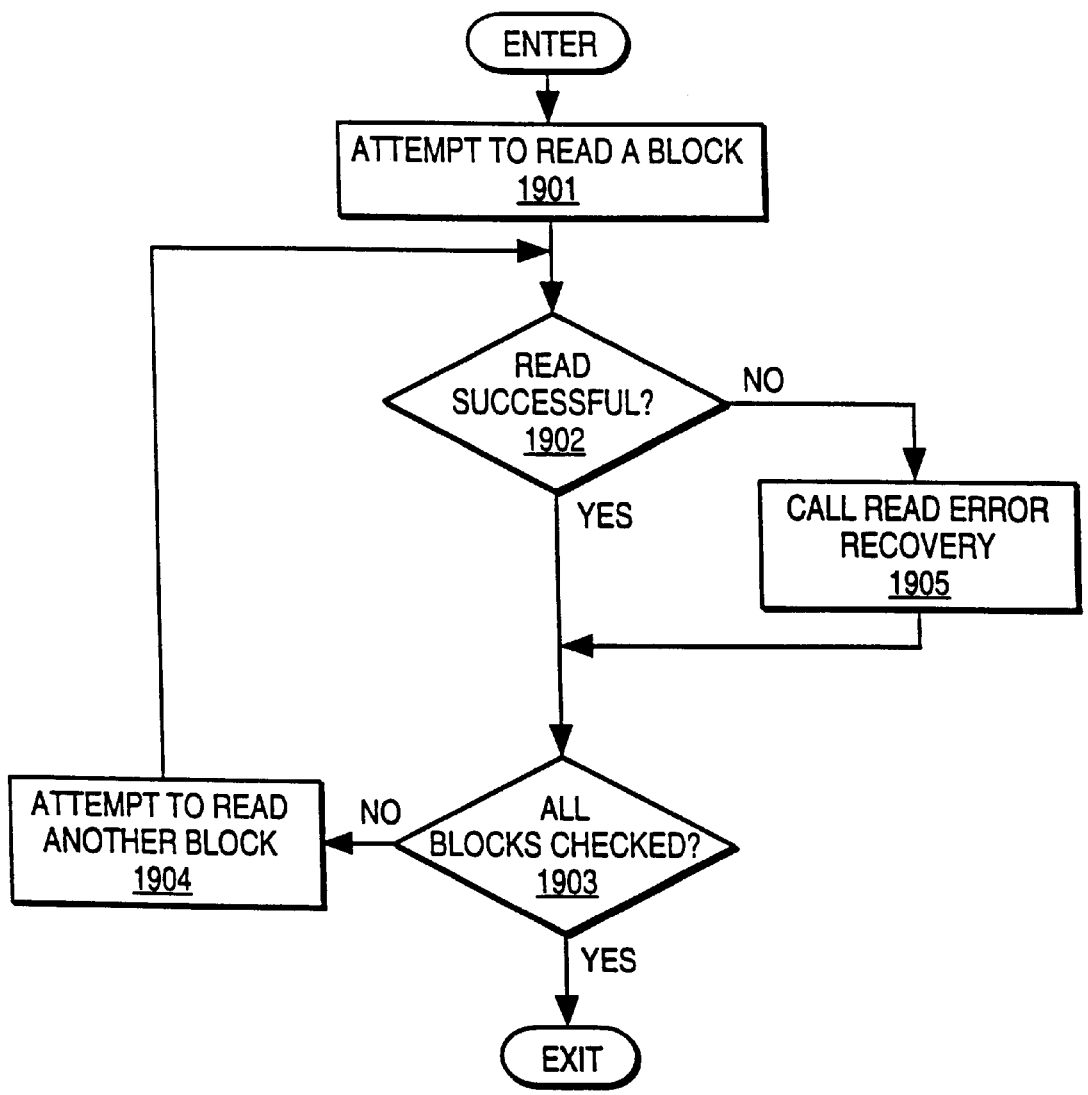
FIG. 19 is a flow diagram illustrating a routine for performing automatic detection and correction of data errors.

Each of the storage controllers may also implement automatic block error detection and reassignment. When the storage controller is idle, it automatically examines data stored in any of the MSDs for errors and corrects detected errors, when possible. FIG. 19 illustrates a routine performed by the storage controller for implementing these functions. In step 1901, the storage controller attempts to read a block of data from a given location. Note that this given location may be within the local storage array or it may be within one of the remote storage arrays. This attempted read (step 1901) operation is not performed in response to any request from a host computer; it is performed on the storage controller's own initiative in response to the system becoming idle. In step 1902, it is determined whether the block was successfully read. If the block was successfully read, then in step 1903 it is determined whether all blocks have been examined; if so, the routine ends. If all blocks have not been examined, then the storage controller attempts to read another block of data in step 1904, and the process repeats from step 1902. If the block was not read successfully, then in step 1905 the storage controller calls the read error recovery routine (FIG. 11).

A storage controller can also be used to migrate data from one storage array to another. The storage controller can be configured to perform data migration automatically and in a manner that is transparent to, and non-disruptive of, any host computer. Further, in contrast with prior systems, which maintain only a single back-up copy of given file, the storage controllers described herein allow two or more back-up copies of a file to be created and maintained in addition to a primary copy. Any copy is then accessible to any host computer connected in the system.

A storage controller further allows data blocks to be write protected, so that a block cannot be modified from any host computer. Write protection may be desirable for purposes such as virus protection or implementation of security firewalls. Write protection can be achieved by configuring the storage controller appropriately at set-up time or by inputting a write protect command to the storage controller from a host computer.

In some applications it may be desirable to copy the contents of an entire storage array to a storage array at a remote location. However, the amount of data to be transferred may be quite large (e.g., in the terabyte range, for some applications). Also, the links 9 between the remote locations may be slow relative to the amount of data to be transferred. Consequently, it may be too time consuming to transfer the data over the communication links 9 to a remote storage array. The following technique addresses this problem.

Figure 20:
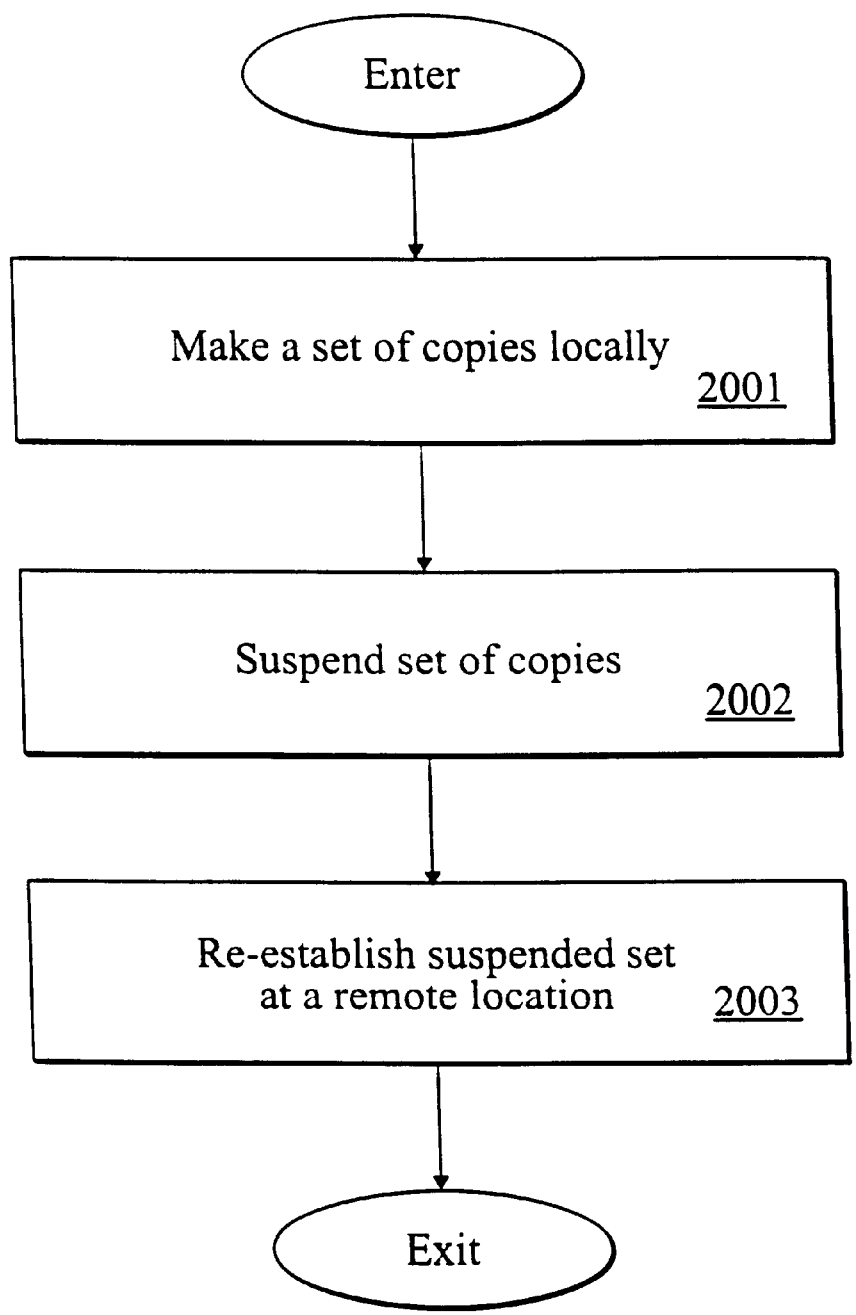
FIG. 20 is a flow diagram illustrating a routine for creating a set of copies of data at a remote location in the network.
Figure 21:
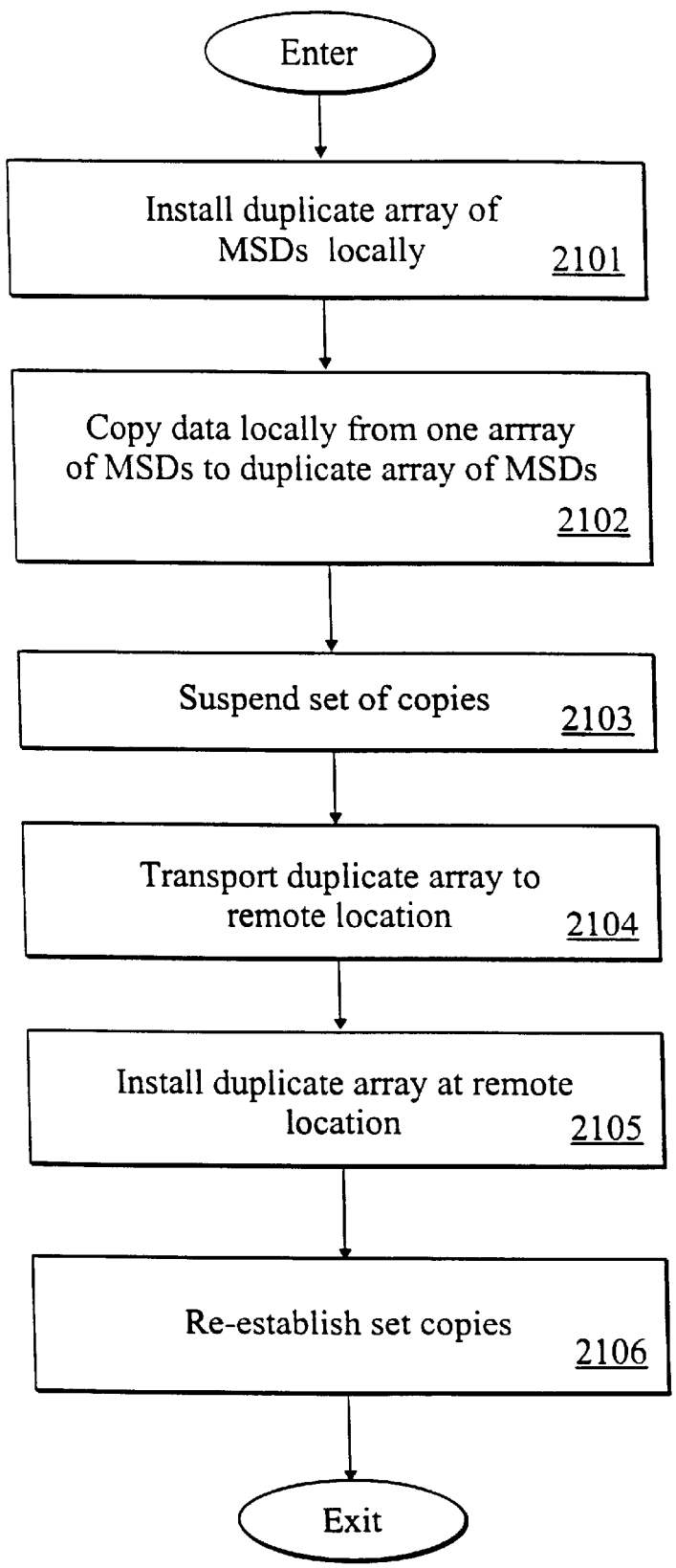
FIG. 21 is a flow diagram illustrating a particular embodiment of the routine of FIG. 20.
Figure 22A:
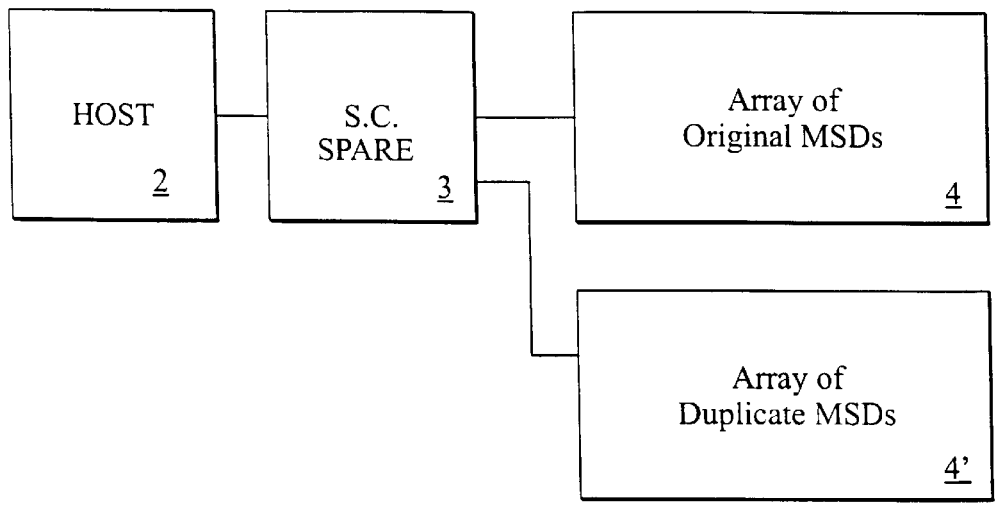
FIGS. 22A and 22B are block diagrams showing two ways in which a set of duplicate MSDs may be coupled to a storage controller for purposes of the routine of FIG. 21.
Figure 22B:
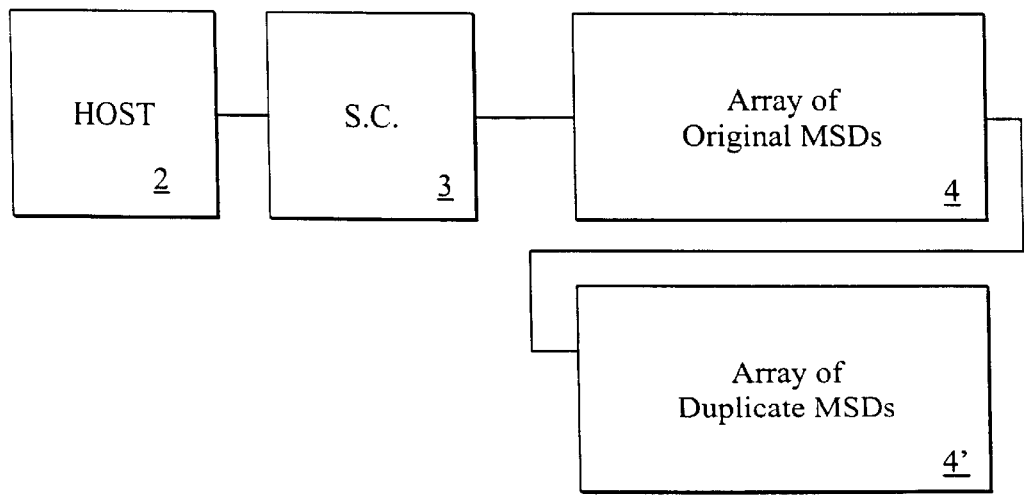

Referring to FIG. 20, the technique, in general, is as follows. Initially, a set of copies of the data of interest is made locally at 2001. At 2002 the set of copies is suspended, and at 2003 the suspended set is reestablished at a remote location. FIG. 21 illustrates a particular embodiment of this technique. Assume that the entire contents of a local storage array is to be copied to a remote location. Hence, at 2102 a duplicate array of MSDs is installed locally (i.e., coupled to a local storage controller). FIGS. 22A and 22B illustrate two alternative ways in which the duplicate array 4' of MSDs can be connected to the local storage controller 3. Specifically, the duplicate array 4' of MSDs may be connected directly to the storage controller 3 via a spare interface on the storage controller 3, as shown in FIG. 22A. Alternatively, as shown in FIG. 22B, the duplicate array 4' may be attached "behind" the original array 4 in a daisy chain fashion.

Next, at 2102, the data of interest is copied from the local storage array in which it is stored to the duplicate storage array. At 2103, the set of copied data is suspended, i.e., parity is no longer maintained. The local storage controller then begins to maintain a map of all changes made to the data from the time the set of copies was suspended until the set is reestablished as described below. Thus, at 2104, the duplicate array of MSDs is transported to the remote location and, at 2105, is installed by coupling it to the remote storage controller. At 2106 the set of copies is reestablished in a manner which will be described below. It will be recognized that an advantage of this technique is that there is little or no disruption to the host processing system and exposure to loss of data.

Figure 23:
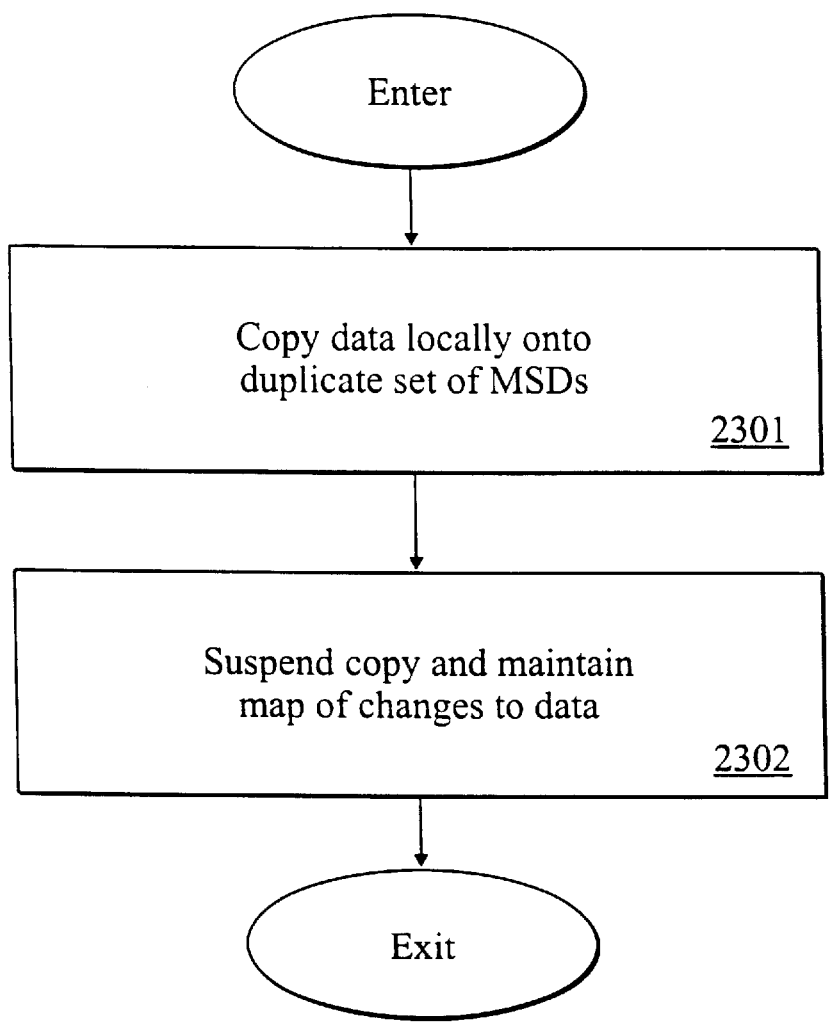
FIG. 23 is a flow diagram illustrating a routine performed in the local storage controller for copying data onto a duplicate set of MSDs.
Figure 24:
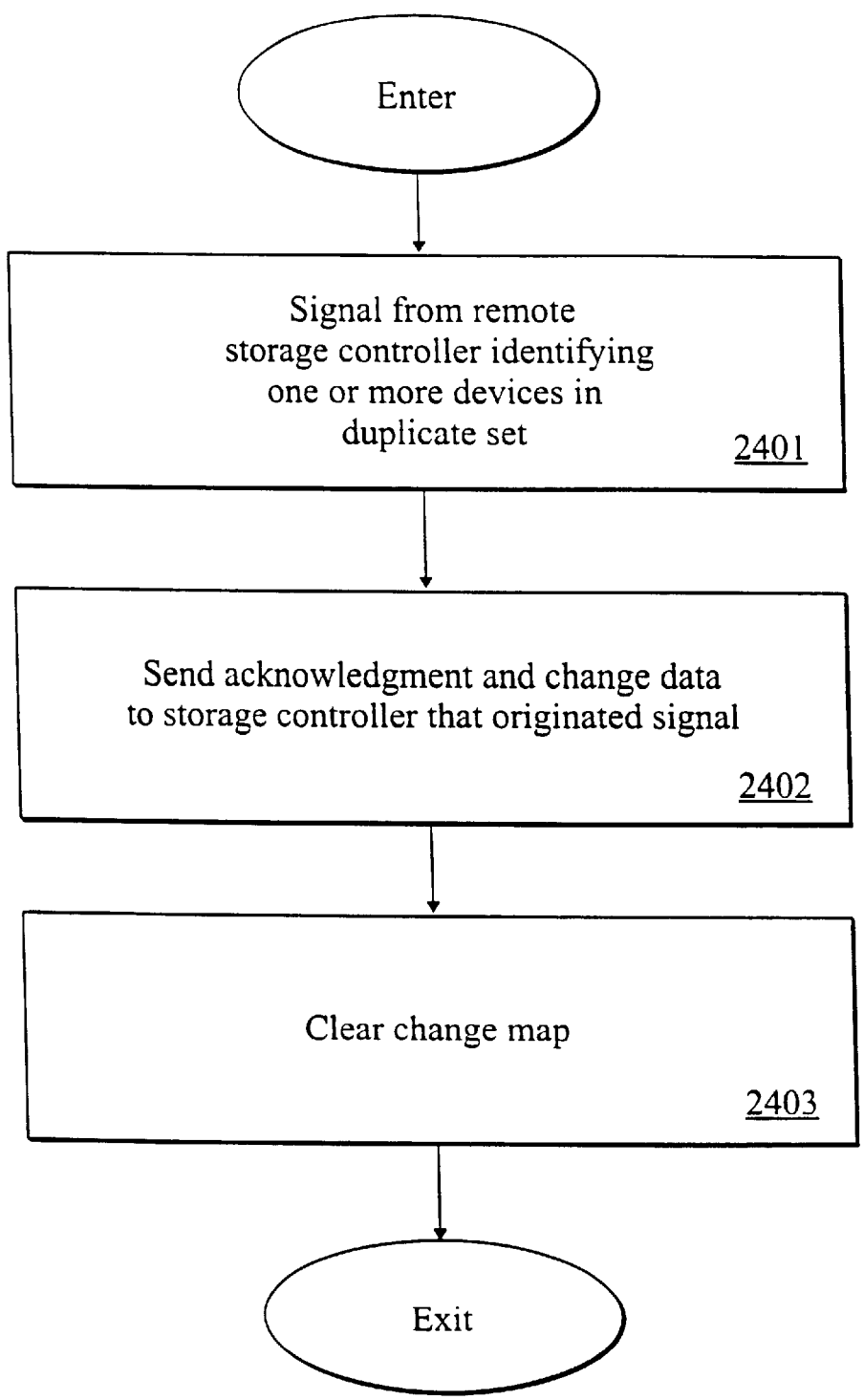
FIG. 24 is a flow diagram illustrating a routine performed in the local storage controller for re-establishing a set of copies.

FIG. 23 illustrates a routine that may be performed by the local storage controller according to the foregoing technique. Specifically, at 2301 the local storage controller copies the data onto the duplicate set of MSDs. At 2302 the local storage controller suspends the set of copies and maintains a map of changes to the data. FIG. 24 illustrates a routine that may be performed by the local storage controller in connection with reestablishing the set of copies. At 2401, the local storage controller receives a signal from the remote storage controller identifying one or more devices in the duplicate set. At 2402 the local storage controller recognizes the specified identity or identities of the devices as having been previously installed locally and, accordingly, sends an acknowledgment and the change data to the remote storage controller that originated the signal. At 2403 the local storage controller clears its change map.

Figure 25:
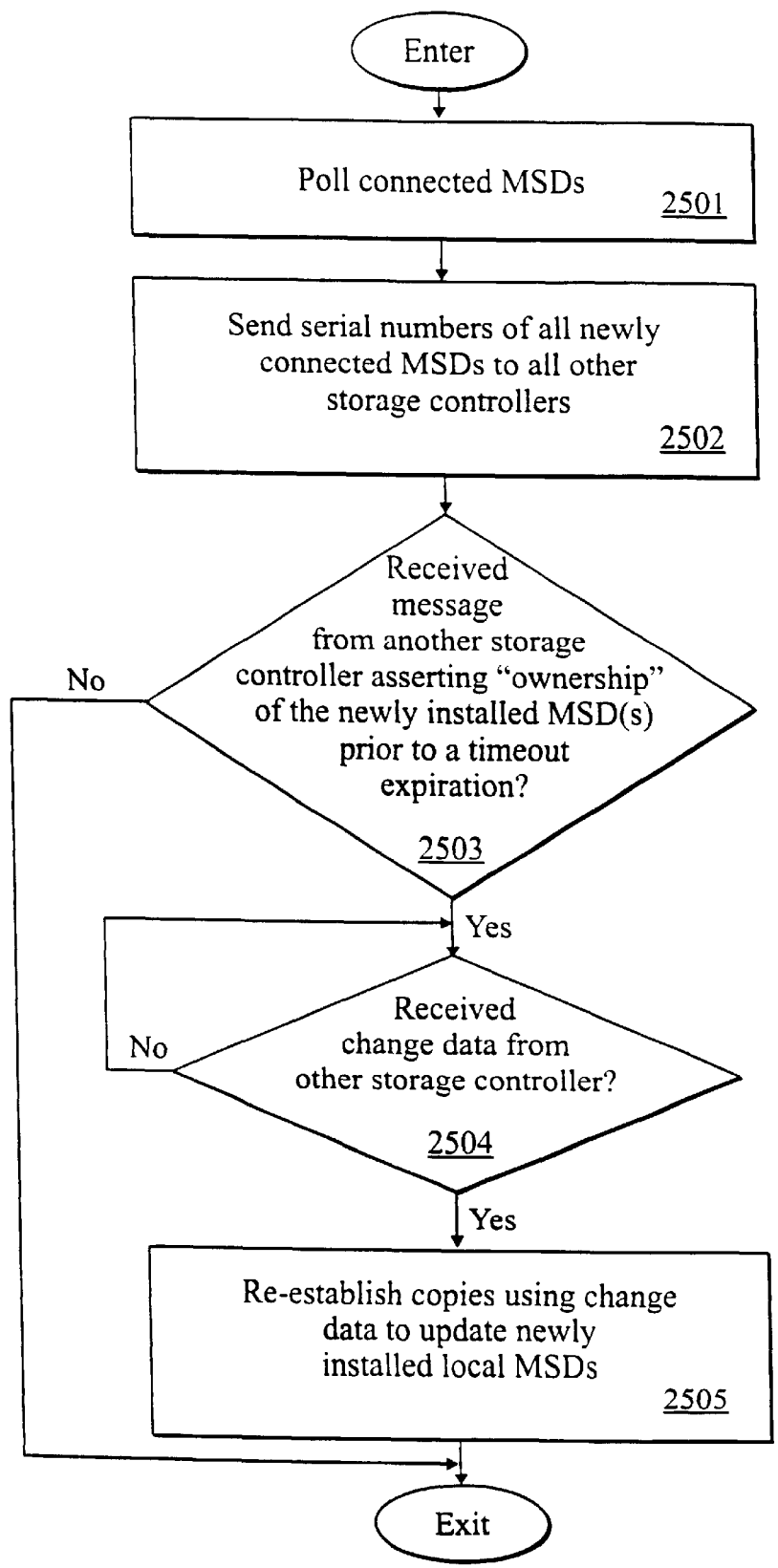
FIG. 25 is a flow diagram illustrating a routine performed in the remote storage controller for re-establishing a set of copies.

FIG. 25 illustrates a routine that may be performed by the remote storage controller in connection with reestablishing the data. In accordance with the present technique, each of the MSDs in the system is identified to the storage controllers in the system by a unique serial number. The serial number may be stored in a read only memory, for example, within each MSD. This identification method is in contrast with methods in which devices are identified by their topological location in the system. Thus, at 2501, the remote storage controller periodically polls the storage devices that are connected to it locally for their serial numbers. Each storage controller maintains a record of the devices to which it is connected locally. Accordingly, upon receiving the responses identifying the devices, the storage controller sends the serial numbers of all newly connected MSDs (i.e., all MSDs connected since the previous poll) to all other storage controllers in the system. The storage controller then waits for a predetermined time-out period for a response from any of the other storage controllers. If, at 2503, a message is received from another storage controller asserting "ownership" of the newly installed MSD(s) prior to the expiration of the time-out period, then at 2504, the storage controller waits to receive change data from such other storage controller. In this context, a storage controller's asserting ownership means that the storage controller indicates that the identified MSD(s) were previously connected to it locally. If no such message is received from another storage controller at 2503, then the routine ends. After the storage controller has received the change data from the other storage controller, at 2505 it reestablishes the copies using the received change data to update the newly installed local MSDs.

Figure 26:
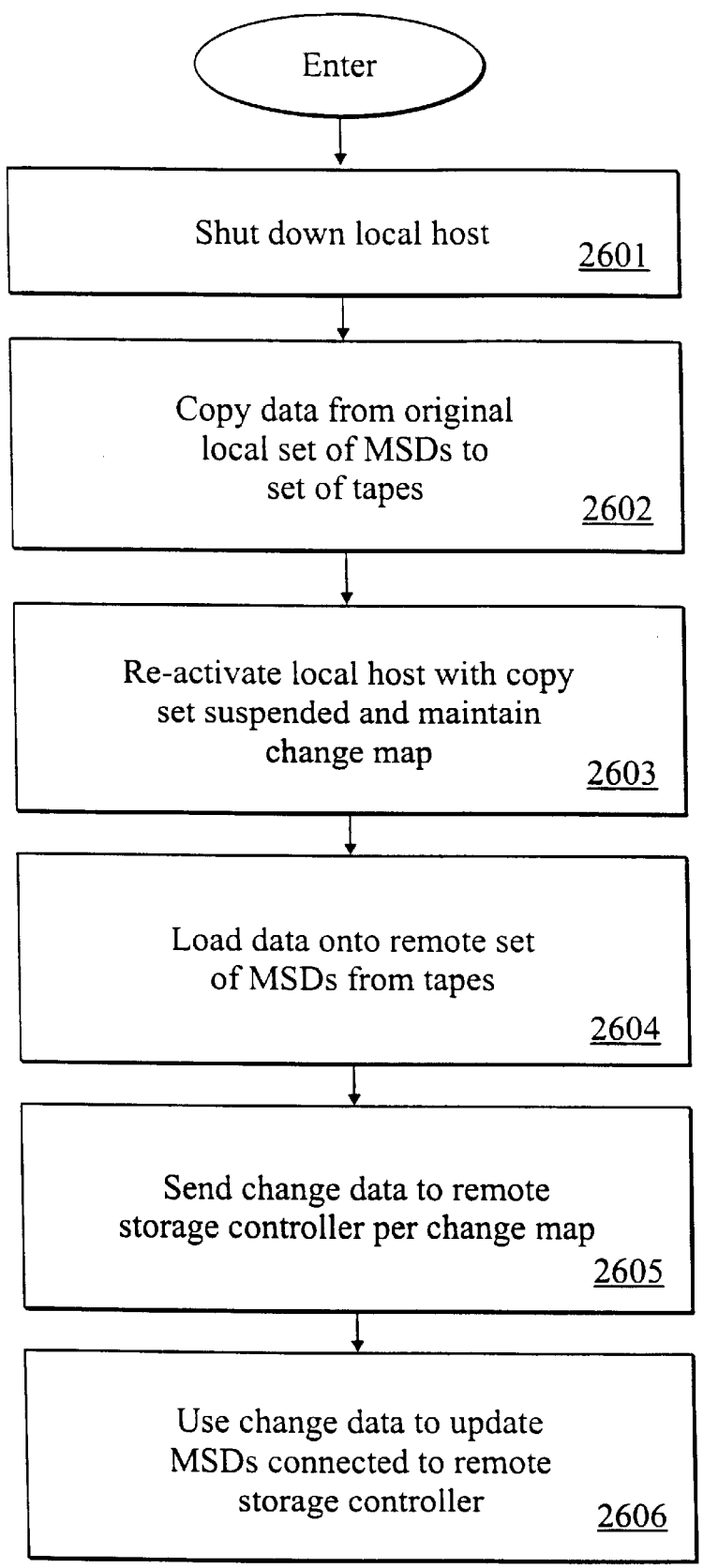
FIG. 26 is a flow diagram illustrating an alternative embodiment of the routine of FIG. 20.

FIG. 26 illustrates an alternative embodiment of the technique of FIG. 20. The alternative embodiment avoids the need to move a duplicate set of MSDs from one location to another. In particular, at 2601, a local host processing system is shut down. All of the data of interest is then copied from the original local set of MSDs to a set of tapes or other equivalent form of non-volatile MSD at 2602. At 2603 the local host processing system is then reactivated with the copy set suspended, and the maintenance of a change map is initiated. At 2604, the data on the tapes (or other MSD) is then loaded onto the remote set of MSDs, and at 2605 the change data is transmitted via communication links 9 to the remote storage controller based on the change map maintained by the local storage controller. At 2606, the remote storage controller uses the change data to update the data that has been loaded onto its locally installed MSDs from the tapes.

Referring again to FIG. 1, the communication links between the various components in the system may be redundant physical links in order to protect against potential failures of any one communication links, as noted above. Another potential failure mode, however, is the failure of one of the storage controllers 3. In particular, it is desirable to avoid a situation in which any data becomes unavailable to any host 2 in the system. Accordingly, the following technique addresses the potential for failure of any one storage controller.

In general, the technique includes providing two or more redundant storage controllers for each storage array 4. In one embodiment, discussed henceforth, a pair of redundant storage controllers is used. One of the pair of storage controllers is a primary storage controller which, under normal circumstances, operates on behalf of the local host and storage array. The other storage controller of the pair is a secondary storage controller which functions as a "hot backup" in the event of failure of the primary storage controller. The secondary storage controller is a quiescent system, the presence of which, under normal circumstances, is transparent to the host processing system and the storage array. In the event of a failure of the primary storage controller, the secondary storage controller assumes primary status, i.e., assumes the operational responsibilities of the primary storage controller. Thus, the potential for a single-point failure caused by one storage controller is avoided.

Figure 27:
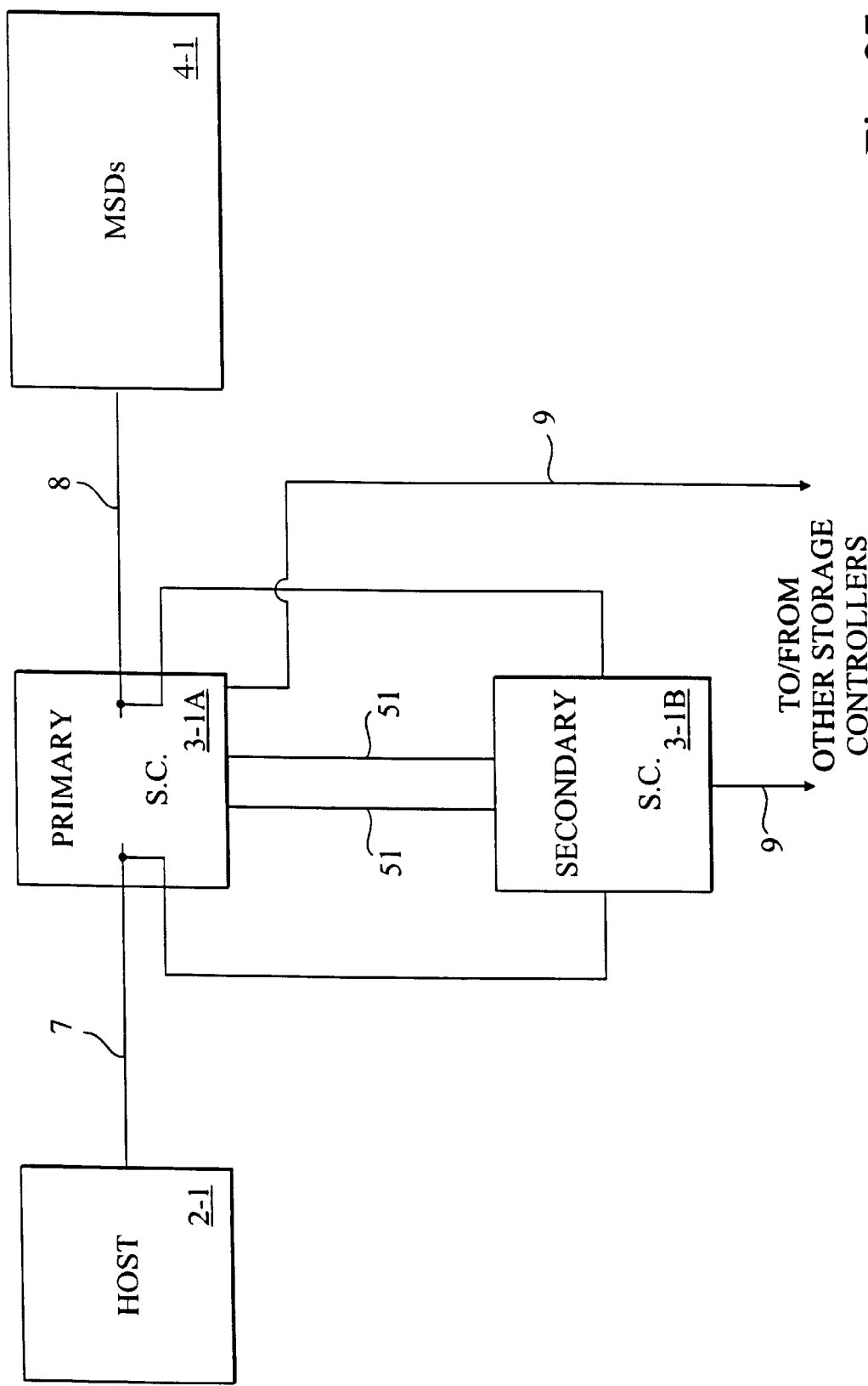
FIG. 27 is a block diagram illustrating the coupling between a redundant pair of local storage controllers according to a first embodiment.

An example of a configuration which uses a primary/secondary storage controller pair is illustrated in FIG. 27. A host processing system may be attached to two or more redundant storage controllers via either separate or shared I/O channels. FIG. 27 illustrates a configuration in which host 2-1 is connected to both a primary storage controller 3-1A and a secondary storage controller 3-1B via a shared I/O channel. Similarly, a storage array may be connected to the storage controllers via a shared or separate I/O channels. FIG. 27 illustrates a configuration in which storage array 4-1 is connected to both the primary and secondary storage controllers 3-1A and 3-1B, respectively, via a shared I/O channel 8.

Figure 28:
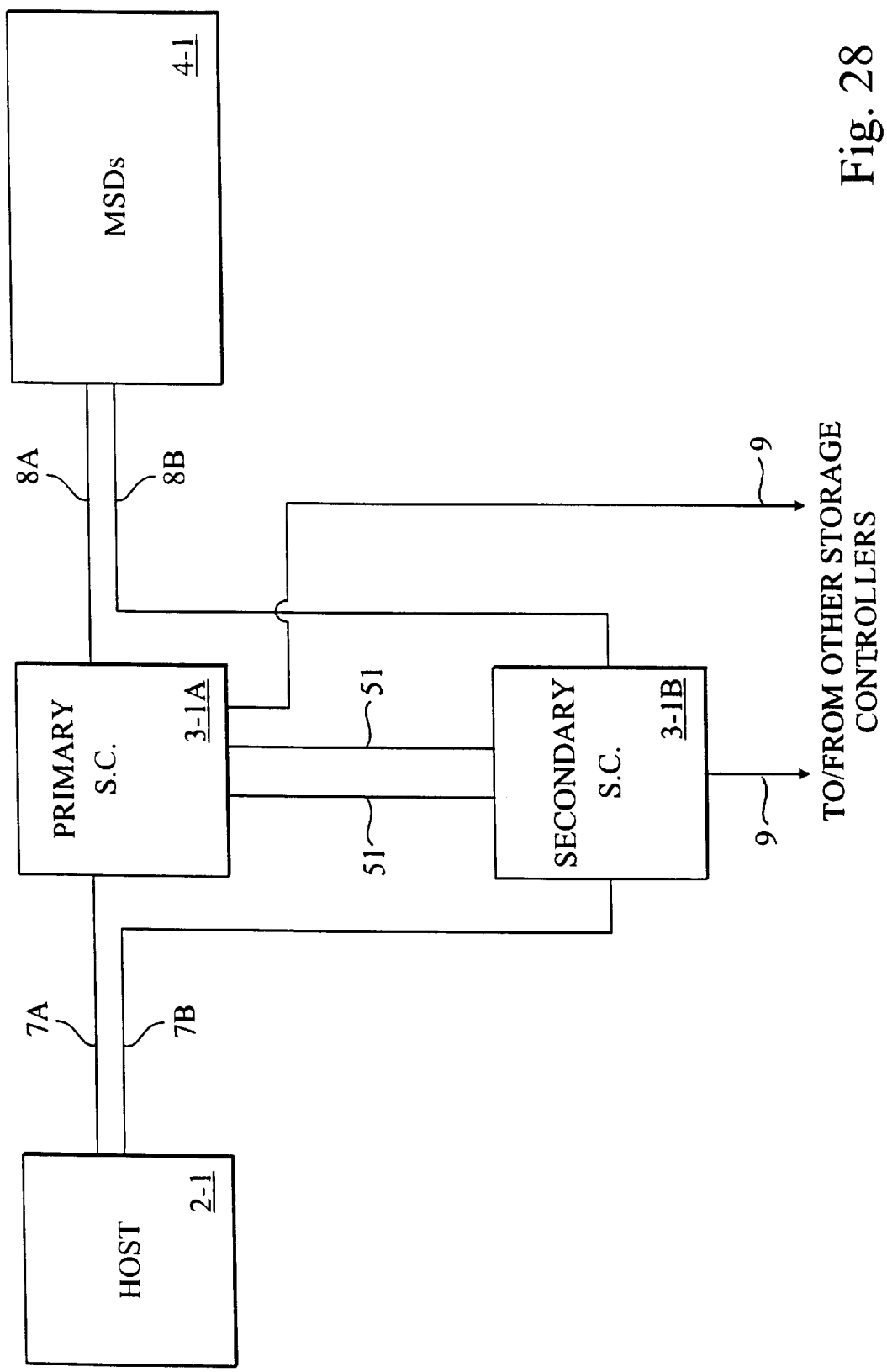
FIG. 28 is a block diagram illustrating the coupling between a redundant pair of local storage controllers according to a second embodiment.

FIG. 28 shows a configuration in which both the host 2-1 and storage array 4-1 are connected to the primary and secondary storage controllers 3-1A and 3-1B, respectively, via separate I/O channels, i.e., channels 7A and 7B, respectively, and channels 8A and 8B, respectively. The primary and secondary storage controllers 3-1A and 3-1B are connected by one or more "fast" communication lines 51, which form a private communication channel between the redundant storage controllers.

The primary storage controller 3-1A responds to host I/O requests. The secondary storage controller 3-1B does not respond to host I/O requests. Both the primary and the secondary storage controller have access to the MSDs 4-1 and have communication links 9 to any other active storage controllers in the system. Data written to a storage array by the host processing system 2-1 are moved to the cache (internal memory) of the primary storage controller 3-1A and transmitted on the communication paths 51 to the secondary storage controller 3-1B. The primary storage controller 3-1A provides the host processing system 2-1 with completion status only after receiving an acknowledgment from the secondary storage controller 3-1B that the data has been received. When the write data are successfully written to the MSDs 4-1, the primary storage controller 3-1A signals the secondary storage controller 3-1B to release the data.

The secondary storage controller 3-1B monitors the operation of the primary storage controller 3-1A via private communication channel 51. If the primary storage controller 3-1A fails, the secondary storage controller takes over for the primary storage controller 3-1A (i.e., assumes primary status) and begins to respond to host I/O requests. Any data in the cache of the (formerly) secondary storage controller 3-1B that have not been released by the (formerly) primary storage controller 3-1A are destaged to the MSDs 4-1.

Figure 29:
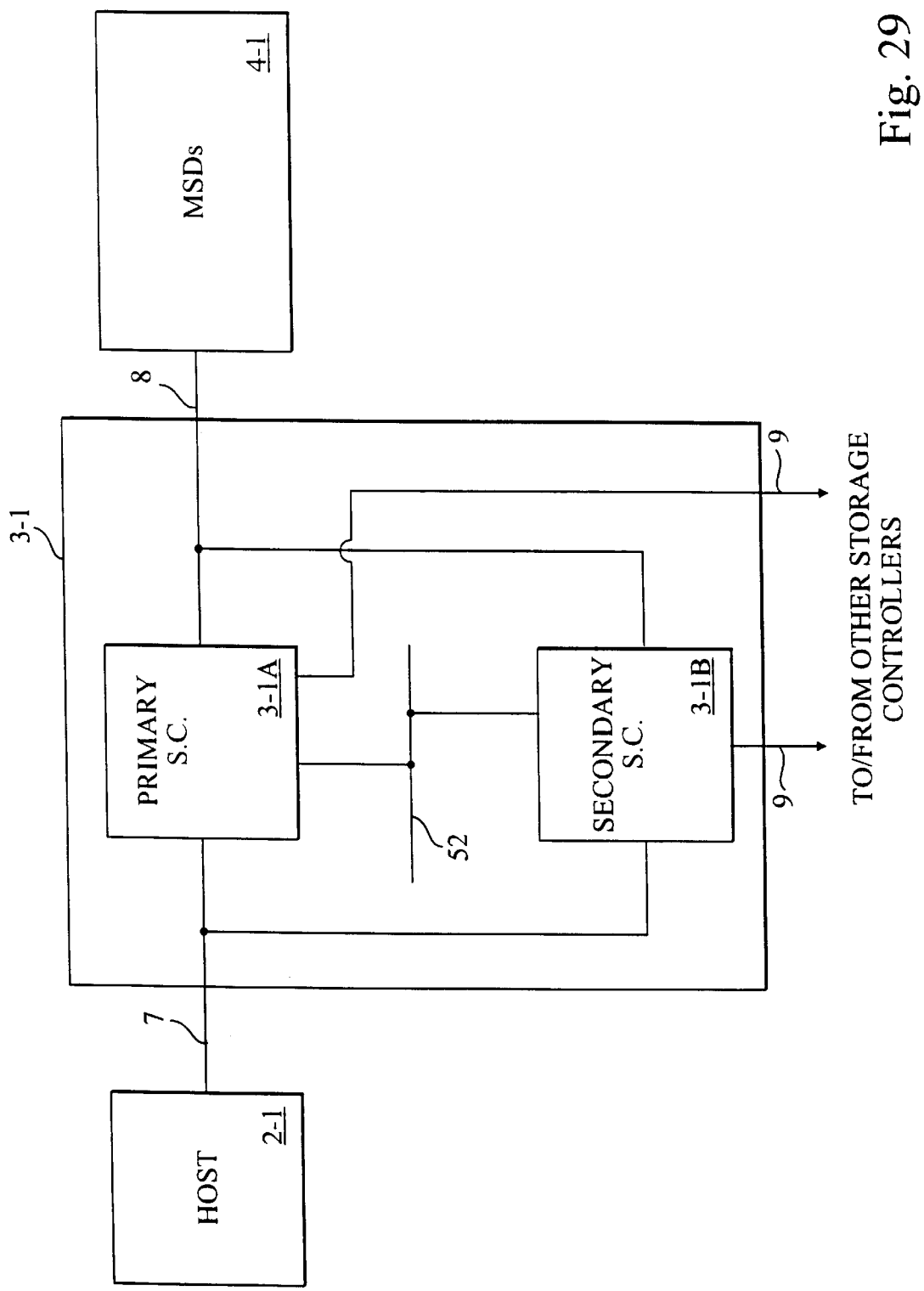
FIG. 29 is a block diagram illustrating the coupling between a redundant pair of local storage controllers contained within a single housing and coupled on a shared bus, in accordance with a third embodiment.

The private communication channel between the redundant storage controllers for any given storage array may be implemented using any suitable fast communication link, such as a gigabit Ethernet link, or as illustrated in FIG. 29, as a shared bus, such as a PCI bus. In the embodiment of FIG. 29, the two redundant storage controllers 3-1A and 3-1B communicate via bus 52 and are installed within a single housing 3-1. The communication between the primary and secondary storage controller may be implemented using any appropriate communication protocol.

Figure 30:
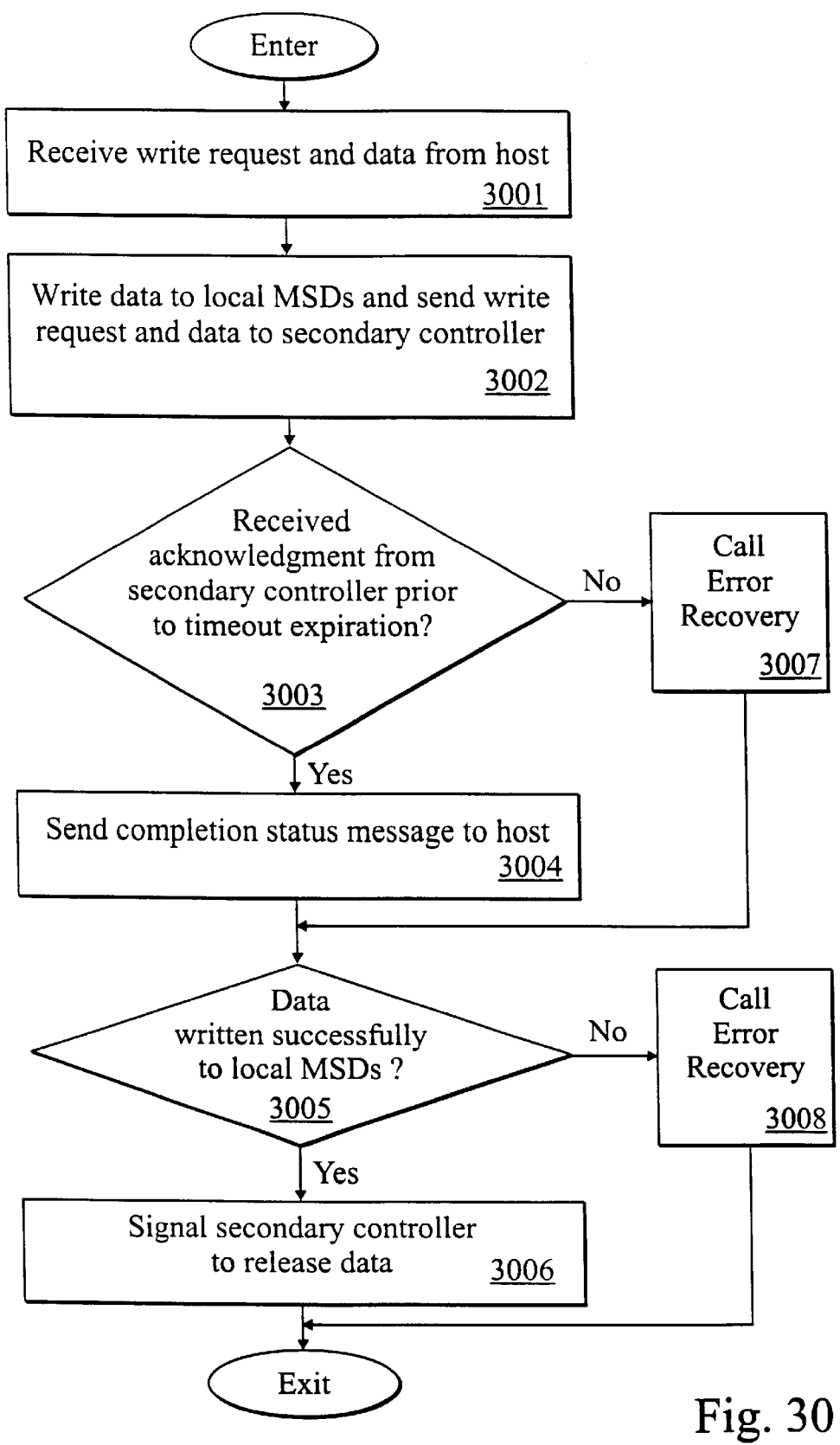
FIG. 30 illustrates a routine that may be implemented by a primary storage controller in conjunction with responding to a write request from a host processing system.

FIG. 30 illustrates a routine that may be implemented by a primary storage controller in conjunction with responding to a write request from a host processing system. At 3001, the primary storage controller receives a write request and associated data from the host processing system. At 3002, the primary storage controller writes the data to the local MSDs and sends the write request and data to its secondary storage controller. At 3003, the primary storage controller determines whether it has received an acknowledgment from the secondary storage controller prior to the expiration of a timeout period. If not, an error recovery routine is called at 3007, and the routine then proceeds to 3005. If an acknowledgment is received within the timeout period, then at 3004 the primary storage controller sends a completion status message to the host processing system. At 3005, it is determined whether the data has been written successfully to the local MSDs. If not, an appropriate error recovery routine is called at 3008 and the routine exits. If the data has been written successfully, then at 3006 the primary storage controller signals the secondary storage controller to release the data, and the routine ends.

Figure 31:
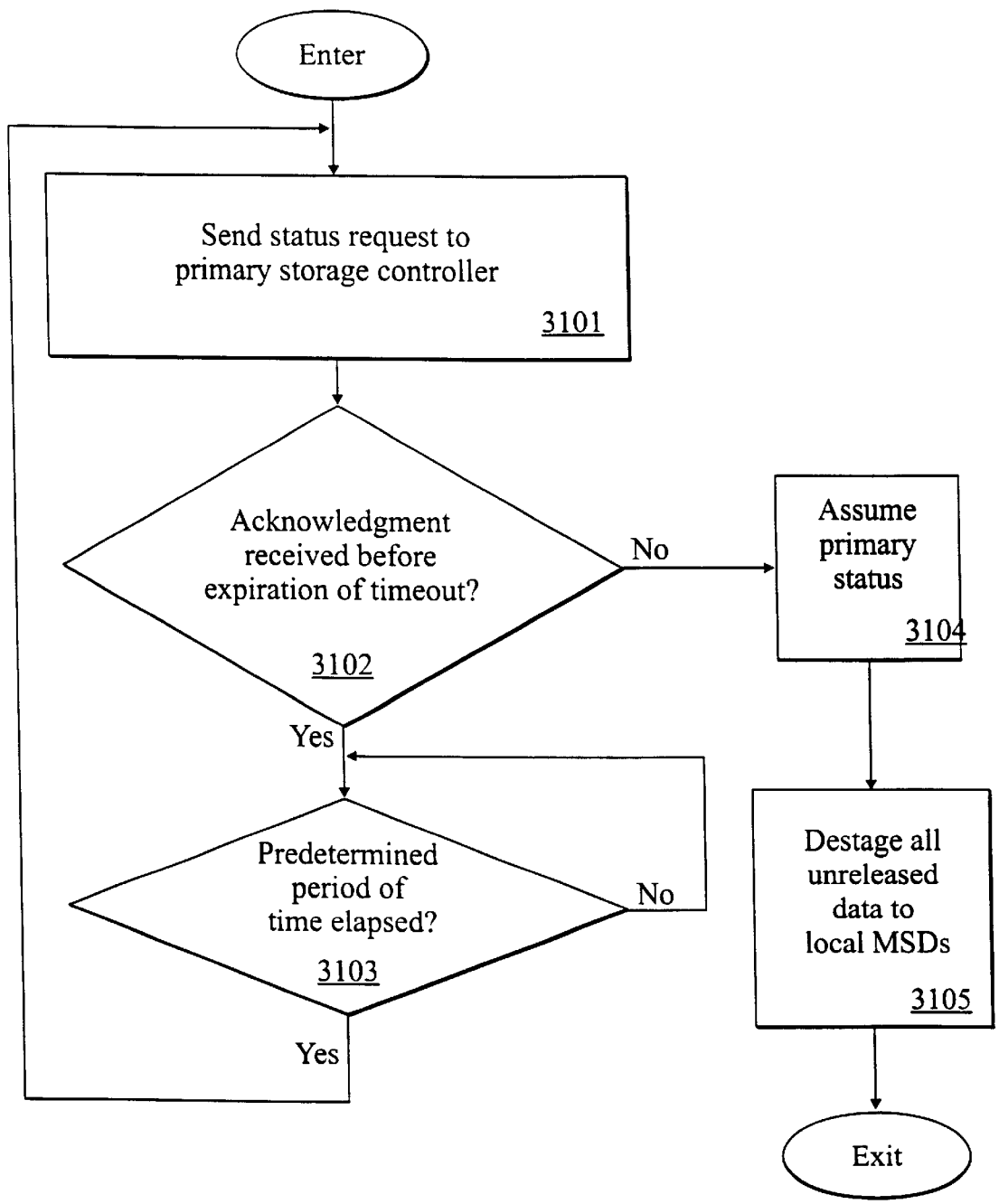
FIG. 31 illustrates a routine that may be implemented in a secondary storage controller in conjunction with monitoring and assuming the functions of the primary storage controller.

FIG. 31 illustrates a routine that may be implemented by a secondary storage controller in conjunction with monitoring and (if necessary) assuming the status of a primary storage controller. At 3101, the secondary storage controller sends a status request to the primary storage controller with which it is associated via the private communication channel. At 3102, the secondary storage controller determines whether an acknowledgment has been received from the primary storage controller before the expiration of a timeout period. If an acknowledgment is received within the timeout period, then at 3103 the secondary storage controller determines whether a predetermined period of time has elapsed, and, if so, the routine repeats from 3101 with the sending of another status request to the primary storage controller. If no acknowledgment of the status request is received within the timeout period, then at 3104 the secondary storage controller assumes primary status. That is, the secondary storage controller assumes all functions of the primary storage controller, which is assumed to have failed. Upon assuming primary status, the storage controller destages any unreleased data in its internal cache to the local MSDs, and the routine ends. When and if the failed primary storage controller is brought back into service, it may assume either primary or secondary status, as desired. Thus, the secondary storage controller operates as a quiescent system, which monitors the primary storage controller and does not respond to host I/O requests, but acts only as a secondary cache on behalf of the primary storage controller. Thus, a single-point failure due to the failure of any one storage controller is avoided.

In a data storage system such as illustrated in FIG. 1, it may be desirable to maintain multiple "time-frozen" copies of data. A "time-frozen" copy is an unmodified copy of the data as it appeared at a given instant in time. Time-frozen copies may be useful for debugging purposes. For example, time-frozen copies may be useful for diagnosing and recovering from a failure of a host processing system or storage device.

One problem associated with maintaining time-frozen copies is how to do so while software applications are running on the host processing system or systems. If backup copies are created while software applications are running, then the potential exists for a write to occur during copying, such that the resulting copy is not truly "time-frozen". Thus, the data copy may be inconsistent if a write took place during the copying process. One prior art approach to the problem of maintaining time-frozen copies is to shut down all applications during the back-up process. The back-up process is often a relatively slow process, however, and when large volumes of data are involved, shutting down the applications may be impractical or undesirable. Another approach is to maintain a duplicate set of the data of interest and, when back-up is desired, to suspend one of the copies of the set, create a new copy from the suspended copy, and then reestablish the pair of copies once the back-up is complete. One problem with this second approach, however, is that while the back up is taking place, there is no longer redundancy in the data storage, i.e., there is no longer a duplicate copy available. Moreover, the back-up process, as noted above, may be time consuming, resulting in a temporary exposure to loss of data.

Accordingly, the following technique allows multiple time-frozen copies to be created and maintained while applications are running on the host processing systems, without creating exposure to loss of data or requiring software applications to be shut down. Any of the storage controllers in the system may be configured to maintain multiple time-frozen copies of the data of interest. The time-frozen back up copies are maintained in the internal memory of the storage controller. For a given storage controller, the data of interest may represent data on its local storage array or data on one or more remote storage arrays. Further, at any given point in time, the storage controller may maintain multiple time-frozen copies, each representing the state of the data of interest at a different point in time.

Figure 32:
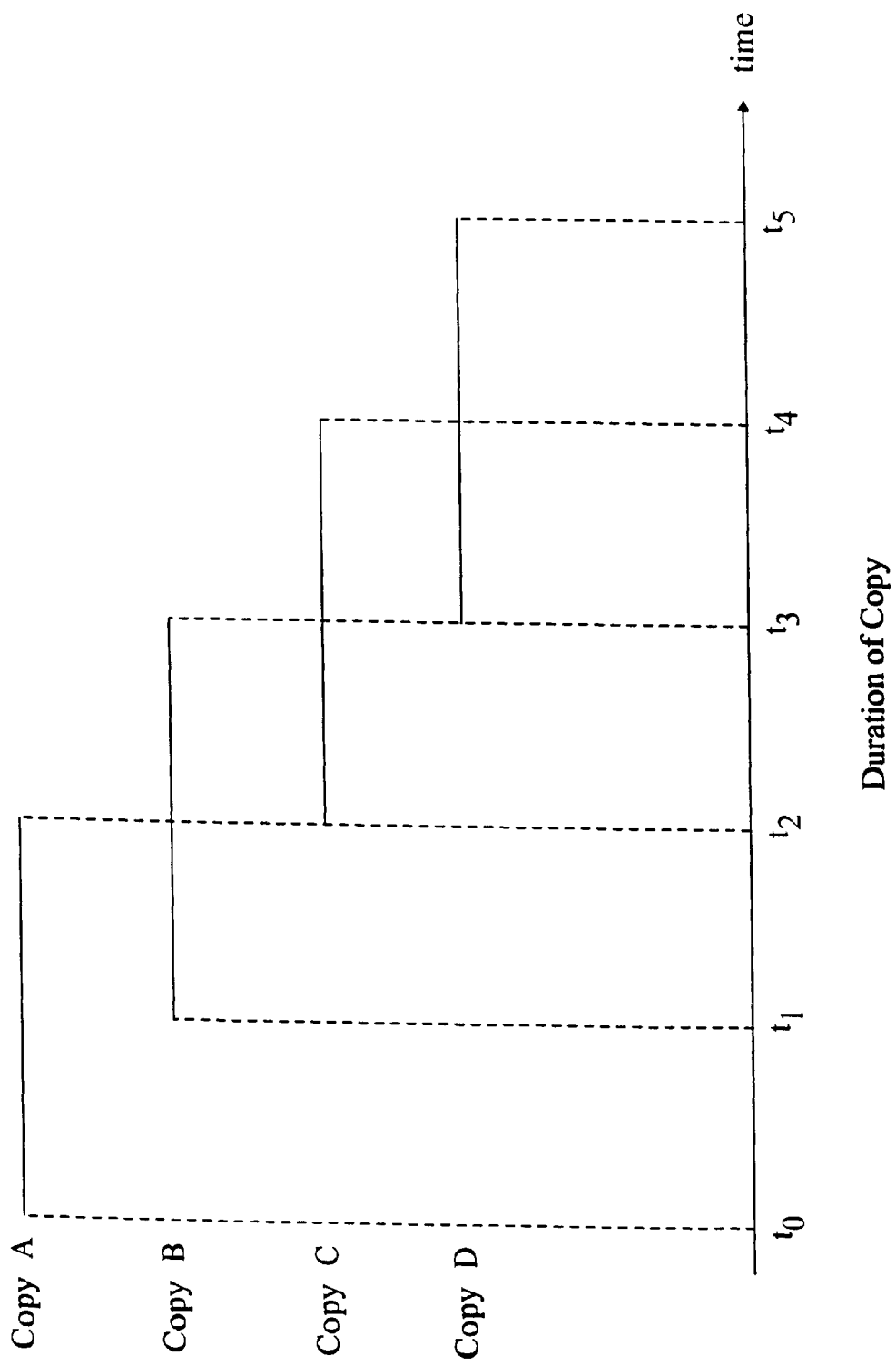
FIG. 32 illustrates the durations of multiple "time-frozen" copies of a set of data with respect to each other.

FIG. 32 illustrates an example of this technique. In particular, a storage controller makes a first copy, Copy A, of the data of interest at time $t_0$. At a later time, $t_1$, the storage controllers makes another copy of the data, Copy B, which reflects any writes that have been performed subsequent to time $t_0$. The storage controller may be configured to discard Copy A at this time, or, as shown, Copy A may be retained until a later time. In the illustrated example, Copy A is retained until time $t_2$ when a third copy, Copy C, is made, which reflects all writes to the data that occurred prior to time $t_2$. Copy B is maintained until time $t_3$ when a fourth copy, Copy D, is created, reflecting all writes to the data prior to time $t_3$. Copy C is maintained until time $t_4$, and Copy D is maintained until time $t_5$. It will be recognized that many other approaches may be used in terms of the number of copies maintained at a given point in time and the times at which copies are discarded and/or created. For example, it is not necessary that the copies overlap in time, although it may be desirable; further, copies may be created and/or discarded at specific points in time (e.g., specific time of day) or at predetermined time intervals (e.g., hourly).

Thus, a storage controller so configured provides the ability to retrieve data created before a given time, even if that data has been modified by host I/O operations. The back-up data is automatically captured at specified intervals, stored in the internal cache of the storage controller, and deleted at specified times or after specified retention periods. Data modified by a host processing system are first copied to storage within the storage controller. Since this storage is transparent to any attached host processing systems, any data mirroring (local and/or remote) continues while this back up facility is operational. Any writes to the data of interest are written only to the MSDs in the storage array and not to the time-frozen copies in the internal cache. Host read operations which access a predetermined primary device address receive the data from the storage array as modified. Any of the time-frozen copies stored in the internal cache of the storage controller may be accessed by a host processing system by accessing a predetermined secondary device address.

After one of the time-frozen copies has been created by the storage controller, subsequent copies are created by storing only the data that has been modified by a host processing system. Data that have not been modified since the previous copy was created are not copied. A host application program may optionally modify one or more of the time-frozen copies by accessing the appropriate secondary device address. This capability allows for application testing, debugging, and/or failure recreation.

In one embodiment, the copies are stored on an internal MSD of the storage controller. In addition to storing the time-frozen copies, the internal cache may also store various other types of data, including copies of data that could not be written to any physical device due to physical device or communication errors.

Figure 33:
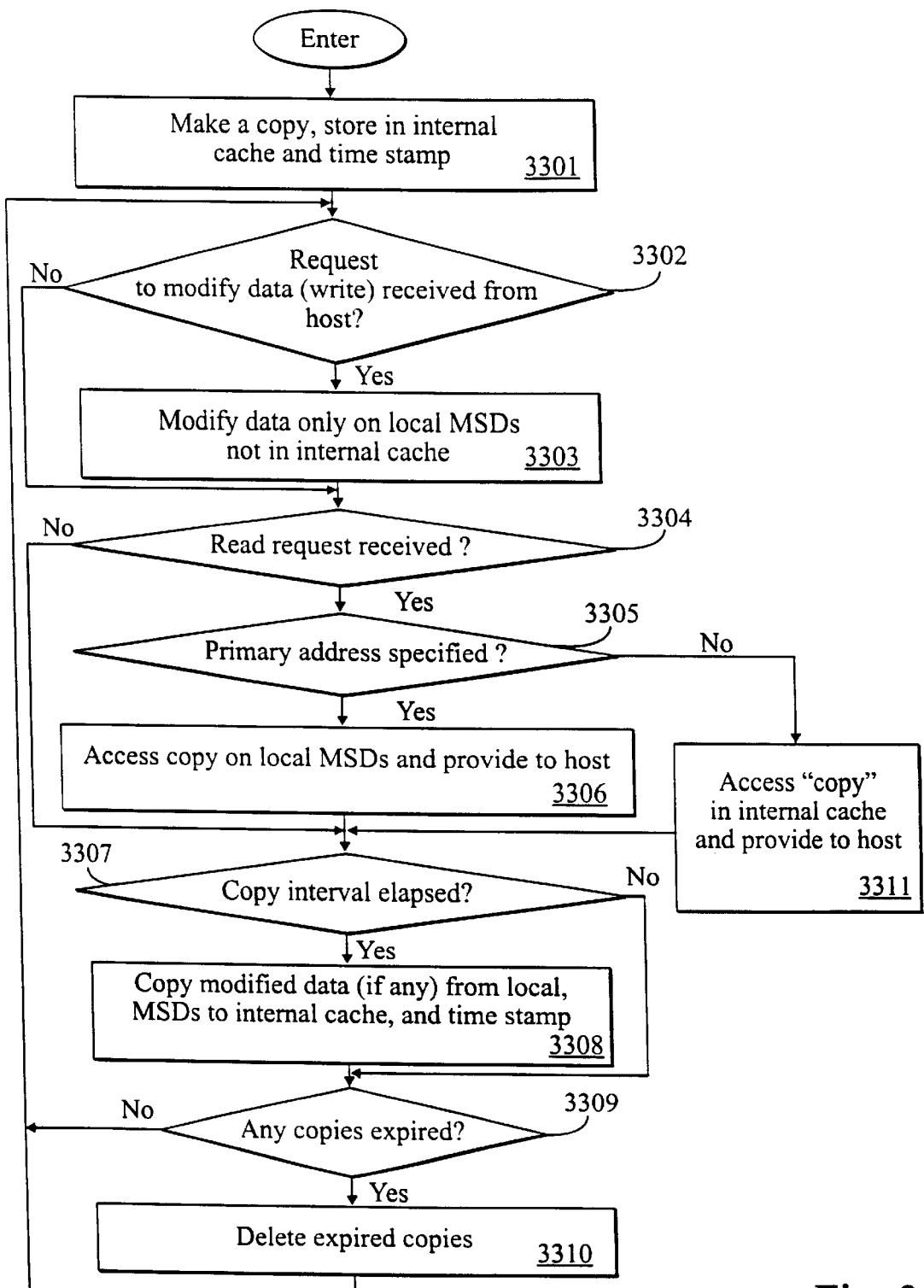
FIG. 33 is a flow diagram illustrating a routine that may be implemented in a storage controller in connection with creating and maintaining multiple "time-frozen" back up copies

FIG. 33 illustrates a routine that may be implemented in a storage controller in connection with the creation and maintenance of multiple time-frozen copies, as described above. At 3301, a storage controller makes a back up copy and stores it in its internal cache, along with a time stamp indicating the time of creation of the copy. At 3302, if the storage controller has received a host request to modify the stored data, then the storage controller modifies the data only on the local MSDs and not in its internal cache. If no write request was received, then the routine proceeds to 3304. At 3304, if a read request has been received, then it is determined at 3305 whether the primary address has been specified. If not, the routine proceeds to 3307. If the primary address was specified, then at 3306 the storage controller accesses the appropriate copy on the local MSDs and provides this copy to the host. If the primary address was not specified, then at 3311 the storage controller accesses the appropriate copy in its internal cache and provides it to the host. At 3307, it is determined whether a copy interval has elapsed. Note that, as mentioned above, other embodiments are possible, such as those in which copies are created at specific times of day, rather than at predetermined time intervals. Thus, if the copy interval has elapsed, then at 3308 any modified data are copied from the local MSDs to the internal cache and time stamped. If the copy interval has not yet elapsed, then the routine proceeds to 3309, in which it is determined whether any copies have expired. If so, then at 3310 any expired copies are deleted. If no copies have expired, or after any expired copies have been deleted, the routine repeats from 3302. Note that many variations upon the above routine are possible.

Thus, the above-described technique allow back up of consistent time-frozen data without requiring the shutting down of host applications. In addition, this technique allows users to retrieve accidentally deleted or overwritten files that existed at the time of the synchronization by copying the files from the internal cache of a storage controller to a primary physical storage device.

The internal storage facilities of the storage controllers described above are advantageous for many reasons. One advantage of this internal caching capability is that it enables data residing on a local storage device to be copied multiple times to different remote locations by sending only a single copy of the data between remote storage controllers. In particular, a storage controller can send a single copy of data residing on its local storage array to one or more remote storage controllers. Each such remote storage controller that receives the single copy can then store the copy in its internal cache and copy it multiple times to various different physical devices in its local storage array. Each controller can then pass on another single copy to one or more other remote storage controllers. This technique allows a virtually unlimited number of copies to be created on different remote storage arrays while substantially reducing the amount of data traffic across the remote communication links 9.

Figure 34:
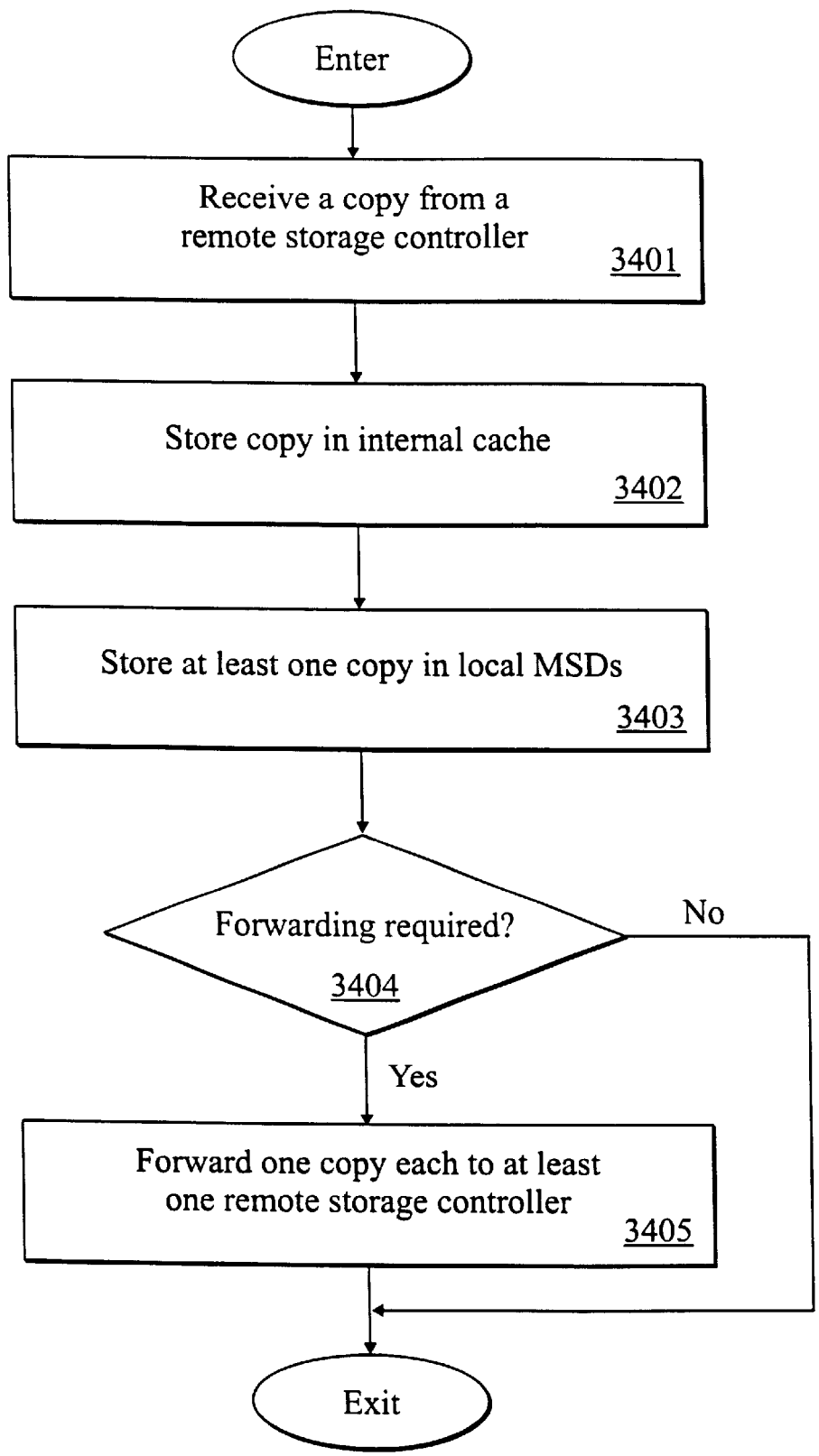
FIG. 34 is a flow diagram illustrating a routine that may be implemented in a storage controller for storing and forwarding copies of data.

FIG. 34 illustrates a routine that can be implemented in a storage controller in accordance with this technique. At 3401, a storage controller receives a single copy of data from a remote storage controller. The storage controller then stores the received copy in its internal cache at 3402. At 3403, the storage controller stores one or more copies of the received data in MSDs in its local storage array. If it is determined at 3404 that forwarding of the data was requested or required, then at 3405, the storage controller forwards one copy each to one or more remote storage controllers. If no forwarding was requested or required, the routine ends. Hence, data can be mirrored on two or more remote devices on the same remote system by sending only a single copy of the data from a local system to the remote system.

Thus, a storage controller capable of providing multiple host computers system with access to multiple storage arrays has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A storage system comprising:
a host processing system;
a plurality of storage arrays located remotely from each other, each of the storage arrays including one or more mass storage devices; and
a plurality of storage controllers, each of the storage controllers coupled locally to a different one of the storage arrays, the storage controllers coupled to the host processing system and configured to provide the host processing system with access to the plurality of storage arrays;
wherein each of the plurality of storage controllers internally maintains and updates a change map representing changes to data stored in the storage array coupled locally thereto.

2. A storage system as recited in claim 1, wherein:
the plurality of storage controllers includes a first storage controller, a second storage controller, and a third storage controller, each located remotely from each other;
the plurality of storage arrays includes a first storage array, a second storage array, and a third storage array coupled respectively to the first storage controller, the second storage controller, and the third storage controller;
the first storage controller is configured to transmit a first single copy of data to the second storage controller;
the second storage controller is configured to respond to the first single copy of the data by internally caching the data and storing one or more copies of the data in the second storage array, and by transmitting a second single copy of the data to the third storage array; and
the third storage controller is configured to respond to the second single copy of the data by internally caching the data and storing one or more copies of the data in the third storage array.

3. A method of operating a storage system including a plurality of storage controllers located remotely with respect to each other, each of the storage controllers locally coupled to one of a plurality of storage arrays, the method comprising:
transmitting a first single copy of data from a first storage controller of the plurality of storage controllers to a second storage controller of the plurality of storage controllers;

receiving the first single copy at the second storage controller;

caching the first single copy within the second storage controller;

using the second storage controller to store a plurality of copies of the data in a storage array locally coupled to the second storage controller based on the first single copy;

using the second storage controller to transmit a second single copy of the data to a third storage controller of the plurality of storage controllers;

receiving the second single copy at the third storage controller;

caching the second single copy within the third storage controller;

using the third storage controller to store a plurality of copies of the data in a storage array locally coupled to the third storage controller based on the second single copy; and in each of the first, second, and third storage controllers, internally maintaining and updating a change map representing changes to data stored in the storage array coupled locally thereto.

* * * * *